(12) United States Patent
Cochran

(10) Patent No.: US 6,662,282 B2
(45) Date of Patent: Dec. 9, 2003

(54) UNIFIED DATA SETS DISTRIBUTED OVER MULTIPLE I/O-DEVICE ARRAYS

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 09/837,311

(22) Filed: Apr. 17, 2001

(65) Prior Publication Data

US 2002/0152362 A1 Oct. 17, 2002

(51) Int. Cl.[7] .............................................. G06F 12/00
(52) U.S. Cl. ....................... 711/162; 711/111
(58) Field of Search ................. 711/162, 112, 711/111, 114; 714/6

(56) References Cited

U.S. PATENT DOCUMENTS

| | | | | |
|---|---|---|---|---|
| 6,275,897 B1 | * | 8/2001 | Bachmat ..................... 711/114 |
| 6,405,284 B1 | * | 6/2002 | Bridge ....................... 711/114 |
| 6,477,627 B1 | * | 11/2002 | Ofek ......................... 711/162 |
| 6,480,970 B1 | * | 11/2002 | DeKoning et al. ............. 714/6 |
| 6,484,235 B1 | * | 11/2002 | Horst et al. ................. 711/114 |
| 2002/0138696 A1 | * | 9/2002 | Kodoma ...................... 711/114 |

* cited by examiner

Primary Examiner—Kimberly McLean-Mayo

(57) ABSTRACT

A hardware configuration and methodology for serializing or partially serializing WRITE requests directed to a unified data set are subsequently distributed to one or more remote arrays containing a corresponding mirror unified data set. For each unified data set, one of the local disk arrays over which the unified data set is distributed is selected as a supervisor disk array, and a unified sequence number component is included within that supervisor disk array. WRITE requests generated by a local array to mirror unified data set data to a mirror unified data set must be associated with a unified sequence number, and the WRITE requests are therefore serialized or partially serialized by the unified sequence number component. Additional direct communications links are provided between the local arrays over which a unified data set is distributed both to facilitate WRITE-request serialization and to provide a redundant communications paths for added reliability.

18 Claims, 18 Drawing Sheets

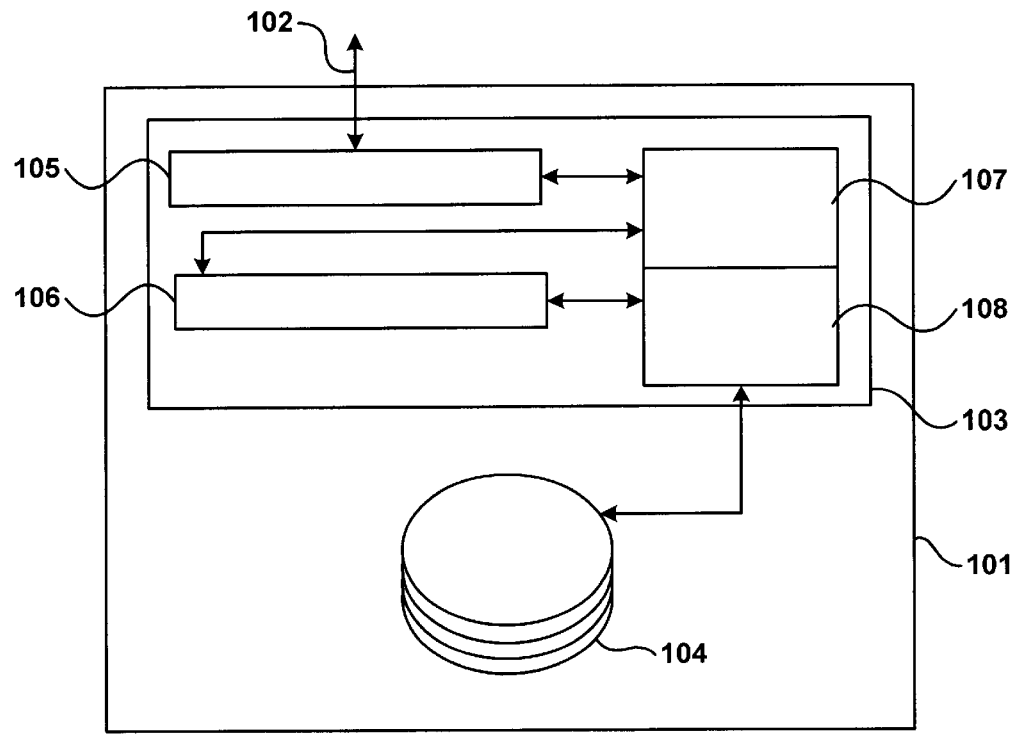
*Fig. 1*
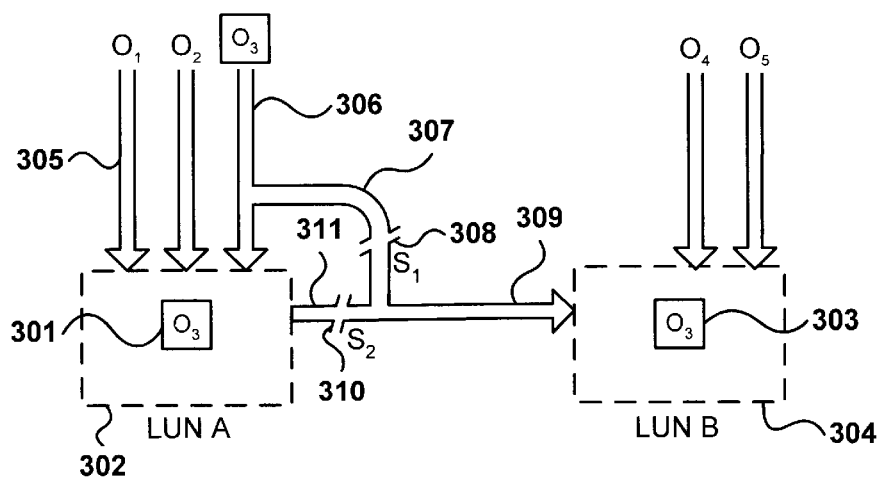
*Fig. 3* <u>PRIOR ART</u>

UNIFIED DATA SETS DISTRIBUTED OVER MULTIPLE I/O-DEVICE ARRAYS

TECHNICAL FIELD

The present invention relates unified data sets stored within local I/O devices that are mirrored to remote I/O devices and, in particular, to unified data sets distributed over multiple local I/O device arrays and mirrored to one or more remote I/O device arrays.

BACKGROUND OF THE INVENTION

The disclosed embodiments of the present invention relates to unified data sets stored on a first number of disk array devices that are mirrored to a second number of disk array devices in order to allow immediate failover in the event of failure of one or more disk array devices. In the described embodiment, the disk devices that store the unified data set together compose a unified data set device group ("UDSDG"), the individual disk drives of which may reside in one or more disk arrays. Therefore, background information about disk and disk-array technologies is provided below.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either read or WRITE requests. A READ request requests that the storage device return to the requesting remote computer some requested amount of electronic data stored within the storage device. A WRITE request requests that the storage device store electronic data furnished by the remote computer within the storage device. Thus, as a result of a read operation carried out by the storage device, data is returned via communications medium 102 to a remote computer, and as a result of a write operation, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105, which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations, in which data is stored onto, or retrieved from, the disk platters 104, is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The disk WRITE requests, in cache memory 207, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write operations directed to various objects stored on a LUN. I/O write operations directed to object "$O_3$" are represented by arrow 306. When object-level mirroring is enabled, the disk array controller providing LUNs A and B automatically generates a second I/O write operation from each I/O write operation 306 directed to LUN A, and directs the second generated I/O write operation via path 307, switch "$S_1$" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write operation, or any other type of I/O operation that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write operations or other I/O operations that change the storage state of primary data object "$O_3$," are automatically reflected to the mirror object "$O_3$" 303.

A unified data set ("UDS") is a set of data stored within a group of I/O devices, such as disk drives, or a group of portions of different disk drives, that is accessed by host computers as a seamless, internally consistent data set with regard to I/O requests. In other words, the host computer can execute I/O requests against the unified data set as if the unified data set were stored on a single I/O device, without concern for managing I/O request sequencing with respect to multiple I/O devices and corresponding mirror devices. A unified data set device group ("UDSDG") is a group of I/O devices, such as disks, that are identified by a host computer to the controller of an array of devices, such as a disk array, as a group of devices which the host intends to treat as a UDSDG. The controller of the disk array then manages and maintains data consistency of the UDSDG at an I/O request level, and, along with a second disk array, maintains data consistency among devices to which the UDSDG is mirrored.

FIG. 4 shows a block diagram of an example hardware platform that supports a unified data set. In FIG. 4, a host computer 402 exchanges data via a communications medium 404 with a local disk array 406. Four disk drives 408–411 of the local disk array 406 are shown in FIG. 4 within a box 412 with boundaries denoted by dashed lines. This box 412 represents a UDSDG comprising the four disk drives 408–411. Incoming I/O requests to the disk array 406 are received by the disk array controller 414 and queued to an input queue 416. The disk array controller 414 removes I/O requests queued to the I/O request queue 416 and passes each dequeued I/O request to an appropriate disk drive from among disk drives 408–411. The local disk array controller 414 presents a LUN-based interface to the host computer 402, but additionally manages I/O-request execution with respect to the disk drives 408–411 so that the UDS distributed among them is consistent with respect to the order of I/O requests directed to the UDS by the host computer. The local disk array controller 414 also mirrors WRITE requests directed to the UDS, and other I/O requests and commands that may result in updating or changing the UDS, to a second, remote disk array 418 that includes four disk devices 420–423 that together compose a mirror UDSDG 426 within the second disk array 418. Should one or more disk drives 408–411 of the UDSDG 412 fail, equivalent data can be obtained by the local disk array controller 414 from the mirror UDSDG 426 on the remote disk array 418. Should the entire local disk array 406 fail, the host computer 402 may, in some cases, establish a communications path directly to the remote disk array 418 that contains the mirror UDSDG 426, and proceed by using the mirror UDSDG 426 and remote disk array 418 as the UDSDG and local disk array, respectively.

For many critical applications, such as database management systems ("DBMSs"), the consistency of data stored within an inter-array unified data set ("IUDS") distributed across two or more local disk arrays, and the consistency of the data of the IUDS mirrored to one or more remote disk arrays, is extremely important. In general, it is acceptable for updates to the mirrored data set stored on the one or more remote disk arrays to lag behind updates to the IUDS stored within two or more local disk arrays. Should a catastrophic failure in communication systems or disk-array hardware occur, a host computer may fail-over to the mirrored data stored on the one or more remote disk arrays and resume operation using a somewhat stale, or, in other words, not completely updated data set. However, in such cases, it is vital that the mirrored data set, although somewhat stale, be consistent, or, in other words, be equivalent to a previous or current data state of the IUDS.

Data inconsistencies may arise from processing I/O requests in an order different from the order in which they are issued by a host computer or from failure to execute one or more I/O requests within a series of I/O requests issued by a host computer. FIGS. 5A–I abstractly illustrate data inconsistency problems arising from out-of-order execution of a sequence of operations and from omission of operations within a sequence of operations. FIGS. 5A–I employ representational conventions illustrated in FIG. 5A. The contents of a portion of a disk drive are represented by a large square 502 that includes smaller, internal subsquares 503–506. A command to alter the contents of the portion of the disk represented by large square 502 is represented by a smaller square 508. Each subsquare 503–506 of the portion of the disk represented by square 502 can have one of two states, a first state represented in FIGS. 5A–I by a darkened, or filled, subsquare and and a second state represented by an empty subsquare. Initially, the portion of the disk has the state shown in FIG. 502, namely all small subsquares have the state "empty." A command, such as command 508, has small internal subsquares 509–512 that represent subsquares 503–506 of the portion of the disk represented by large square 502. When a subsquare within a command is darkened, or filled, the command directs the corresponding large subsquare within the portion of the disk 502 to be placed in the darkened, or filled, state. Thus, command 508 directs filling of subsquare 504. When a small subsquare within a command is cross-hatched, such as small internal subsquares 509 and 511, the state of the corresponding large subsquares is unchanged by the command. Finally, when a small internal subsquare of the command is empty, or unfilled, such as subsquare 512, the command directs the corresponding large internal subsquare of the portion of the disk represented by large square 502 to be empty.

FIGS. 5B–D show application of three successive commands 514–516 to an initially empty portion of a disk as represented by large square 502 in FIG. 5A. Application of command 514 to large square 502 of FIG. 5A produces the modified large square 518 in FIG. 5B. Application of command 515 to modify large square 518 produces modified large square 520 in FIG. 5C, and, similarly, application of command 516 to modified large square 520 produces the final state represented by large square 522 in FIG. 5D. For the series of commands 514–516, modified large squares 518, 520, and 522 represent successive consistent states.

FIG. 5E represents the application of commands 514–516 to an initially empty data state, with the final data state 522 shown at the right of FIG. 5E. Thus, FIG. 5E encapsulates the separate operations illustrated in FIGS. 5B–D.

FIG. 5F illustrates application of commands 514–516 in an order different from the order of application shown in FIG. 5E. In FIG. 5F, command 515 is first applied, followed by 514, and finally by command 516. Note that the final data state 524 is different from the final data state 522 produced by invocation of the commands in-order, as illustrated in FIG. 5E. Thus, by changing the order in which commands 514–516 are applied, a different final data state is obtained. Similarly, FIG. 5G illustrates omission of command 515 from the sequence of commands. In FIG. 5G, command 514 is first applied, followed by command 516. Note that the final data state 526 is different from the final data state 522 produced by the in-order application of the commands illustrated in FIG. 5E. Two final examples, shown in FIGS. 5H and 5I, respectively, illustrate that commands may be applied out of order, or commands may be omitted, without changing the final data state. In FIG. 5H command 514 is first applied, followed by command 516 and finally by command 515, and yet the final data state 528 is identical to the final data state 522 produced by in-order application of the commands, as illustrated in FIG. 5E. FIG. 5I shows that omission of command 514 does not alter the final data state 530.

In order to achieve consistent and meaningful data states, DBMSs normally enforce serialization of primitive database operations, resulting in a corresponding serialization of corresponding WRITE requests generated by the DBMS to update the state of the database stored on one or more disk drives. The state of the database, as stored on the one or more disk drives, normally changes from one fully consistent data state to another fully consistent data state. Mirrored disks can be used to ensure that a redundant fully consistent data state is contained within the mirror disks, generally lagging, to some small degree, the most current state of the database stored on local disks. In simplified terms, referring to FIGS. 5B–D, the mirror disk may lag the local disks by some number of operations, so that, for example, the mirror disk, at a particular instant in time, may have data state 518 while the local disks may have, at the same instant in time, data state 522. Thus, in this example, commands 515 and 516 have been applied to the local disk before they have been applied to the mirror disk. However, both the mirror disk and the local disk, at any given instant in time, have consistent data states. In other words, the instantaneous state of the data is a data state that would be expected to occur by in-order processing of a series of commands. If the local disk fails, the mirror disk is consistent, although some number of commands may need to be re-issued in order to bring the mirror disk up to the state of the local disk at the time of failure. However, if commands are issued in different orders to the local disk and the mirror disk, then either the local disk or the mirror disk may end up in an inconsistent state. For example, if commands 514–516 are applied to the local disks in order, as illustrated in FIG. 5E, and are applied to the mirror disk out-of-order, as illustrated in FIG. 5F, then the mirror disk will have a state 524 inconsistent with the data state resulting from application of commands to the local disk 522.

A DBMS may produce extremely complex database states, with millions or billions of data entities organized in extremely complex interrelationships. The DBMS manages these data states so that all the data interdependencies are consistent and reflect the result of actual database operations carried out over time in a real-world system. The consistency of a database depends on WRITE operations issued by the DBMS to the disk drives containing the database being carried in a specified order, without omissions and without mistakes. If the WRITE operations are carried out in a different than that specified by the DBMS, or WRITE operations are omitted or fail and the omissions and failures go undetected by the DBMS, the database state may quickly become inconsistent, and the intricate interdependencies of the data contained within the database may quickly become hopelessly and unrecoverably confused.

Data consistency problems may arise within a UDSDG group that are analogous to the above-described data consistency problems. The local disk array controller 414 can overcome such data consistency problems by ensuring that WRITE requests, and other I/O requests and commands that can update or change data within the UDS, are executed by the local disk array in precisely the order in which they are issued by the host computer, and that WRITE requests, and other I/O requests and commands that can update or change data of the UDS, are executed by the remote disk array in precisely the order that they are issued by the disk array controller of the local disk array. In the following discussion, the term "WRITE request" indicates either a WRITE request or any other type of I/O request or command that can update or change data within a UDS.

Guaranteeing execution of WRITE requests by the local disk array 406 in FIG. 4 in the same order as the WRITE requests are issued by the host computer 402 in FIG. 4 is generally accomplished within the communications protocol through which data is exchanged via the communications medium 404 in FIG. 4, or by the host computer waiting for acknowledgement for each WRITE request before issuing a subsequent WRITE request.

These I/O-request-sequencing techniques are sufficient to maintain data consistency within and between the UDSDG 412 and the mirror UDSDG 426. However, it may be desirable to implement UDSDGs having alternative configurations. FIG. 6 is a block diagram of a distributed, inter-array unified data set device group ("IUDSDG"). FIG. 6 shows an IUDSDG 602a and 602b distributed between two local disk arrays 604a and 604b. The IUDSDG 602a–b is mirrored to a mirror UDSDG 606 on a remote disk array 608. As will be discussed in detail, below, the sequencing techniques described above for the UDSDG configuration illustrated in FIG. 4 are inadequate to guarantee data consistency within and between the IUDSDG 602a–b and mirror UDSDG 606. Various disk array manufacturers and distributed data storage providers have attempted to provide data consistency solutions that would allow for an IUDSDG such as that shown in FIG. 8. Many of these techniques have attempted to rely on time-stamping of WRITE requests issued by local disk arrays 604a–b to provide sequencing of WRITE requests received by remote disk array 606. Unfortunately, problems associated with maintaining time stamp consistency between two different disk arrays have proved to be extremely difficult to solve, and the prior-art techniques have not provided reliable data consistency in IUDSDGs such as the IUDSDG shown in FIG. 6. For this reason, manufacturers of disk arrays and distributed data storage solution providers have recognized a need for a method and hardware platform to guarantee data consistency within IUDSDGs.

SUMMARY OF THE INVENTION

One embodiment of the present invention provides a method and hardware configuration to allow for data-consistent, inter-array, unified data set device groups ("IUDSDG") distributed over two or more local disk array devices and mirrored to one or more remote disk array devices. The two or more local disk arrays are interconnected by dedicated communications links. When the mirror UDSDG is distributed over two or more remote disk arrays, the remote disk arrays are likewise interconnected by dedicated communications links. One of the local disk arrays is designated as the supervisor and the remaining local disk arrays are designated as subordinates. The supervisor is enhanced according to the present invention to include a unified sequence number ("USN") component used to serialize or partially serialize WRITE requests generated by the local arrays and directed to one or more remote disk arrays to mirror WRITE requests issued to an IUSDSG distributed among the local arrays.

BRIEF DESCRIPTION OF THE DRAWINGS

FIG. 1 is a block diagram of a standard disk drive.

FIG. 3 illustrates mirroring within a disk array.

DETAILED DESCRIPTION OF THE INVENTION

Figure 2:
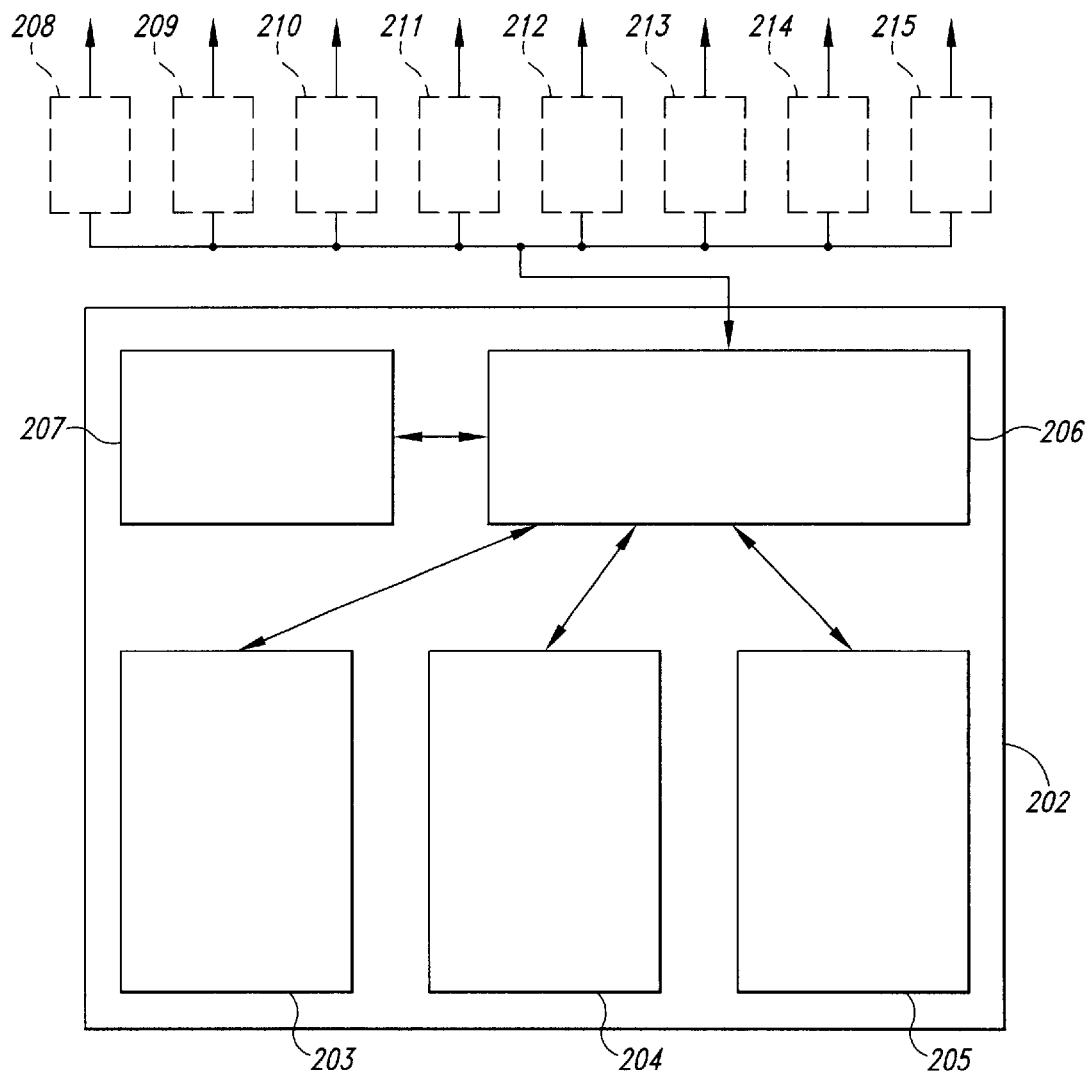
FIG. 2 is a simple block diagram of a disk array.
Figure 4:
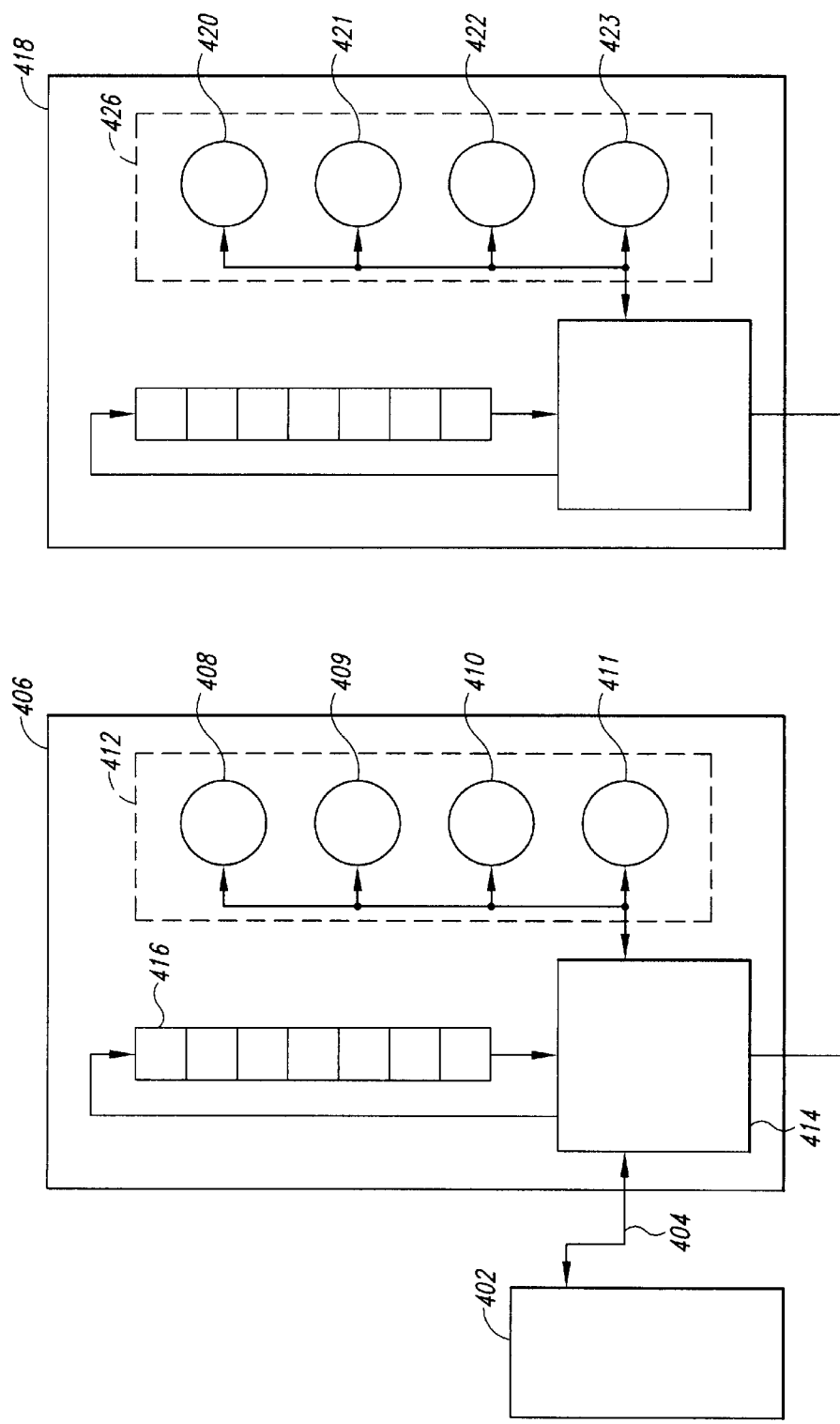
FIG. 4 shows a block diagram of an example hardware platform that supports a unified data set.
Figure 5A:
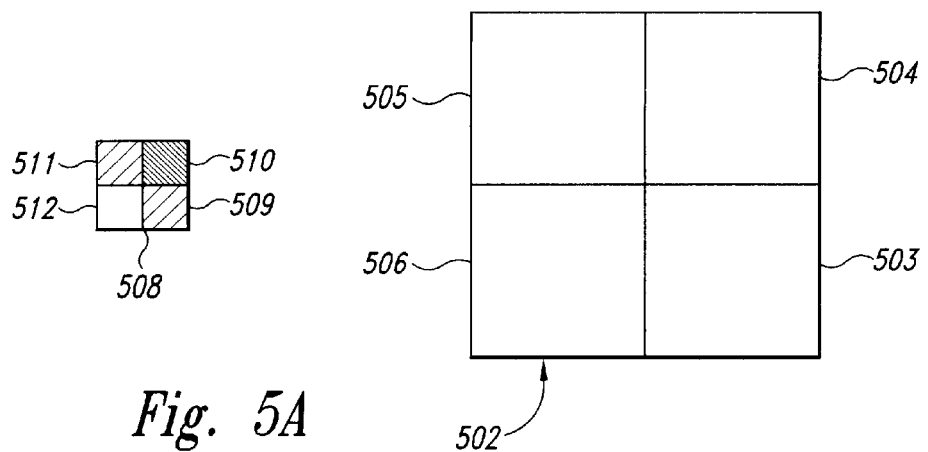
FIGS. 5A–I abstractly illustrate data inconsistency problems arising from out-of-order execution of a sequence of operations and from omission of operations within a sequence of operations.
Figure 5B:
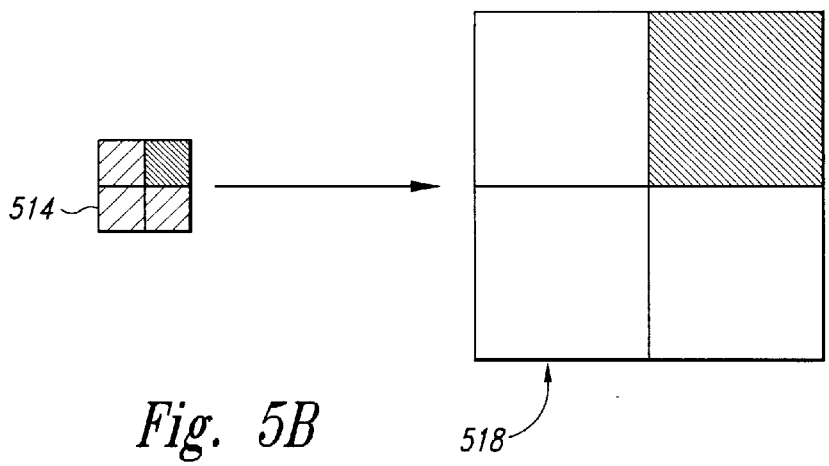
Figure 5C:
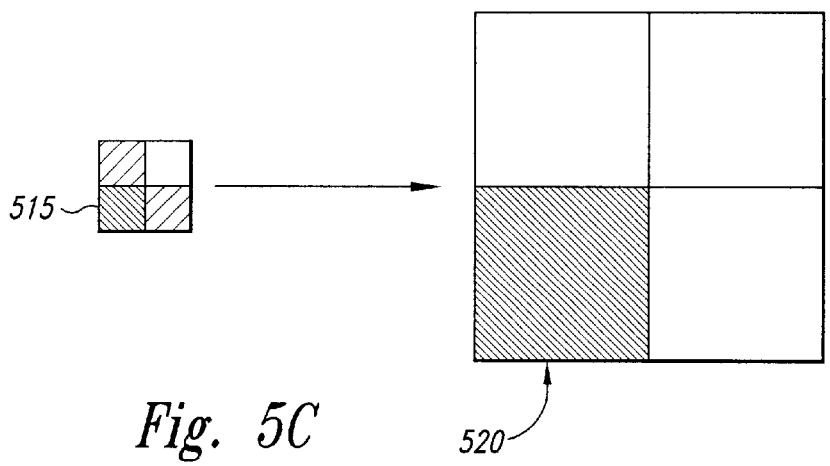
Figure 5D:
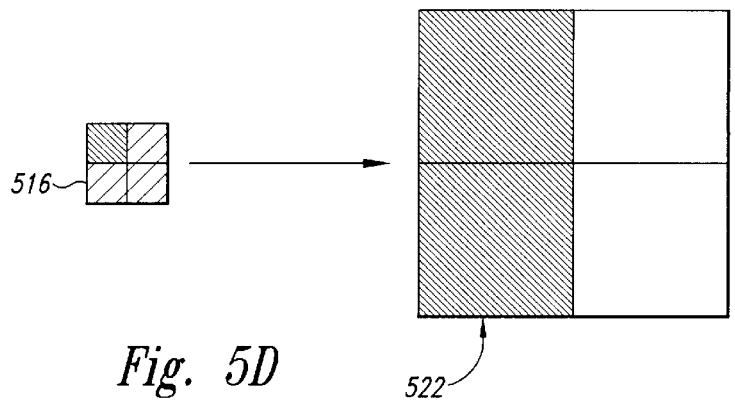
Figure 5E:
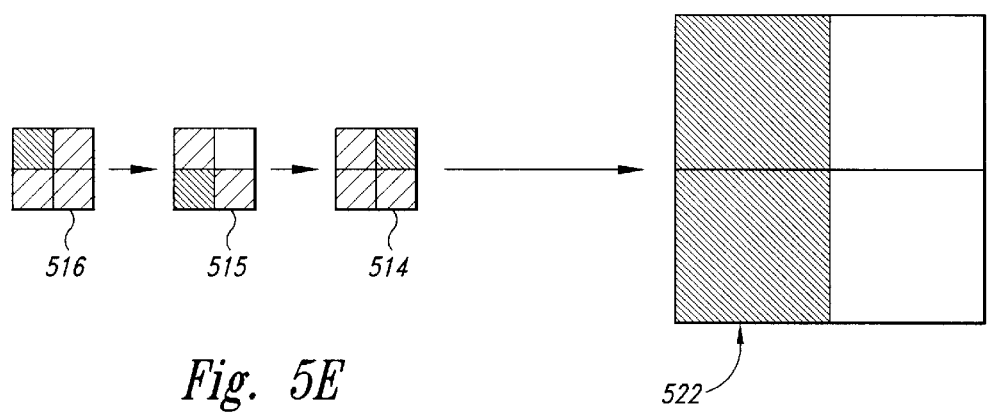
Figure 5F:
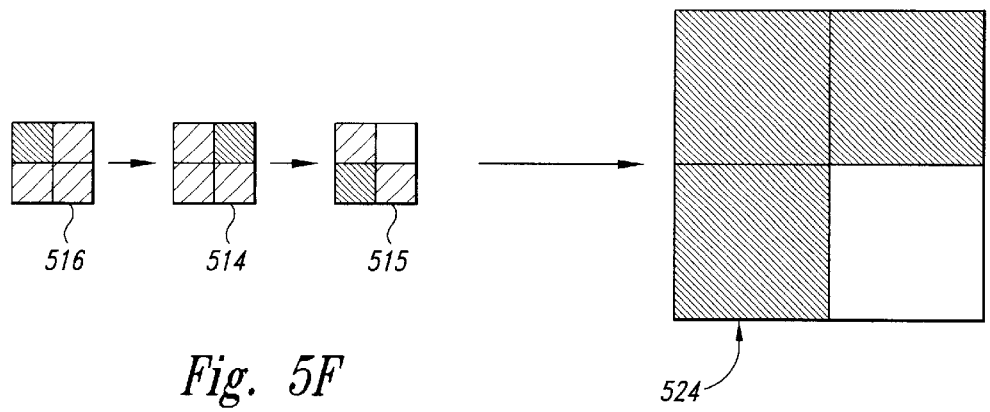
Figure 5G:
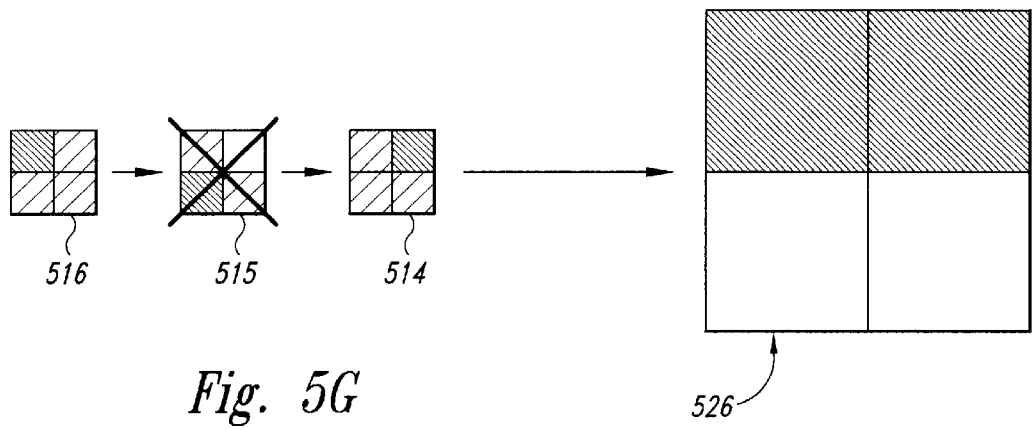
Figure 5H:
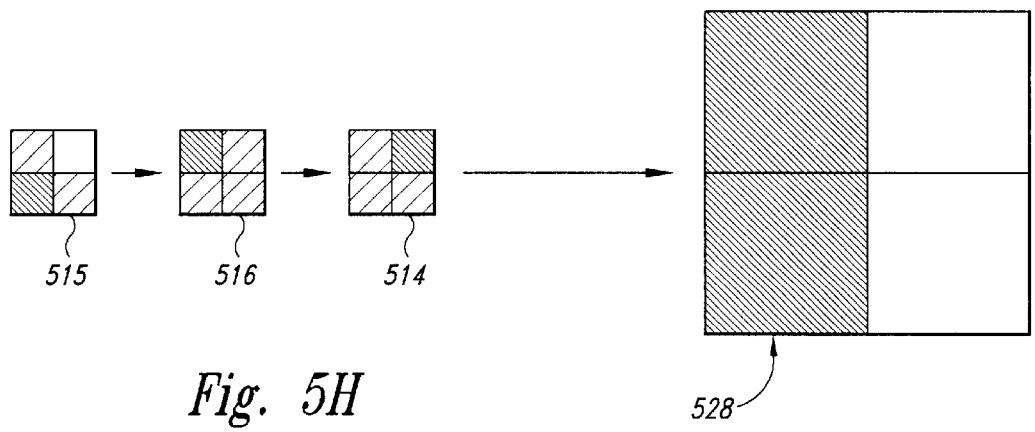
Figure 5I:
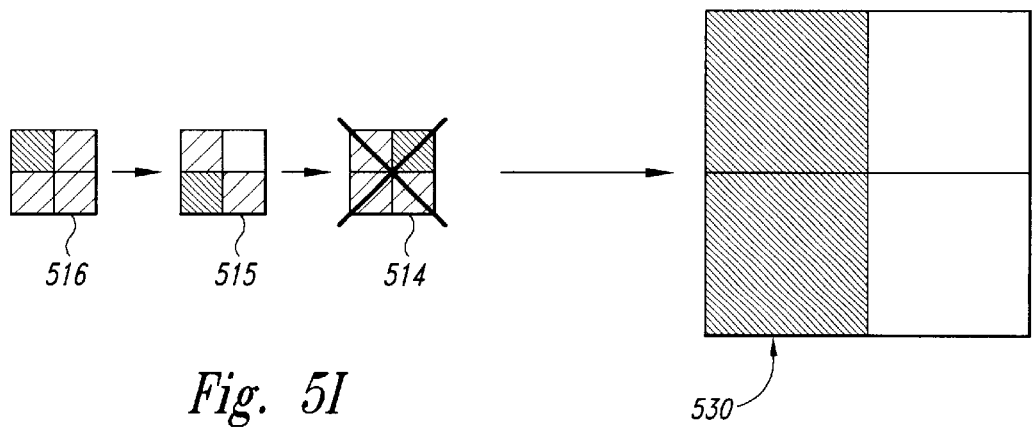

In one embodiment of the present invention, an IUDSDG is distributed over several array devices by adding a direct communications link between the local array devices, by designating one of the array devices as a supervisor and the remaining array devices as subordinates, and by implementing within the supervisor a unified sequence number ("USN") component that facilitates serialization of IUDSDG-related WRITE requests to a mirror UDSDG store within one remote disk array device or a mirror IUDSDG stored within two or more remote disk array devices. Just as serialization is used in software-implemented DBMSs for data consistency purposes, serialization of WRITE requests related to a particular IUDSDG between the local arrays and one or more remote arrays ensures data consistency within the mirror UDSDG or mirror IUDSDG.

The present invention supports two different types, or modes, of mirroring for UDSDGs and IUDSDGs. In synchronous mirroring mode, a local array containing all or a portion of a UDSDG forwards a WRITE request to the mirroring remote array and receives confirmation from the remote array that the forwarded WRITE request was received by the remote array prior to executing the WRITE request on the local array. Completion of WRITE requests on both the local and remote array's cache may not be deferred, so that the data state of the UDSDG and mirror UDSDG are necessarily synchronized, or kept in lock-step equivalency. Writes from the array write cache to the physical disk drives take place at the convenience of the array controller. Under synchronous writing, it is sufficient that the write data reside in the local and remote array write caches prior to issuance of the reply to the requesting host computer. In asynchronous mirroring mode, the local disk array that contains all or a portion of a UDSDG may execute a WRITE request, (with a reply to the host, prior to receiving confirmation of receipt by a remote disk array of a mirror WRITE request from the local array. As with synchronous mode, arrays are considered to have completed write requests as soon as the write data resides in array controller write cache. The data will later be migrated to the physical disks at the convenience of the disk array controller. Thus, in asynchronous mirroring mode, the data states of a UDSDG and a mirror UDSDG are allowed to diverge from one another to a greater extent than in synchronous mirroring mode. In asynchronous mirroring mode, the data state of the mirror UDSDG or mirror IUDSDG lags the data state of the local UDSDG or IUDSDG. Depending on the amount of write activity and the capacity of the communications link to the mirror array, the mirror UDSDG or IUDSDG may be many writes behind, e.g. from a few to many thousands. Each local UDSDG/mirror UDSDG pair or local IUDSDG/mirror UDSDG or mirror IUDSDG pair may be either in synchronous mirroring mode or asynchronous mirroring mode, but not in a mixed mode. A disk array may concurrently support many different UDSDGs and IUDSDGs, the different UDSDGs and IUDSDGs having different mirroring modes. Thus the mirroring mode is an attribute of a UDSDG/mirror UDSDG pair, rather than an attribute of the disk arrays on which the UDSDG and mirror/UDSDGs are implemented.

Figure 6:
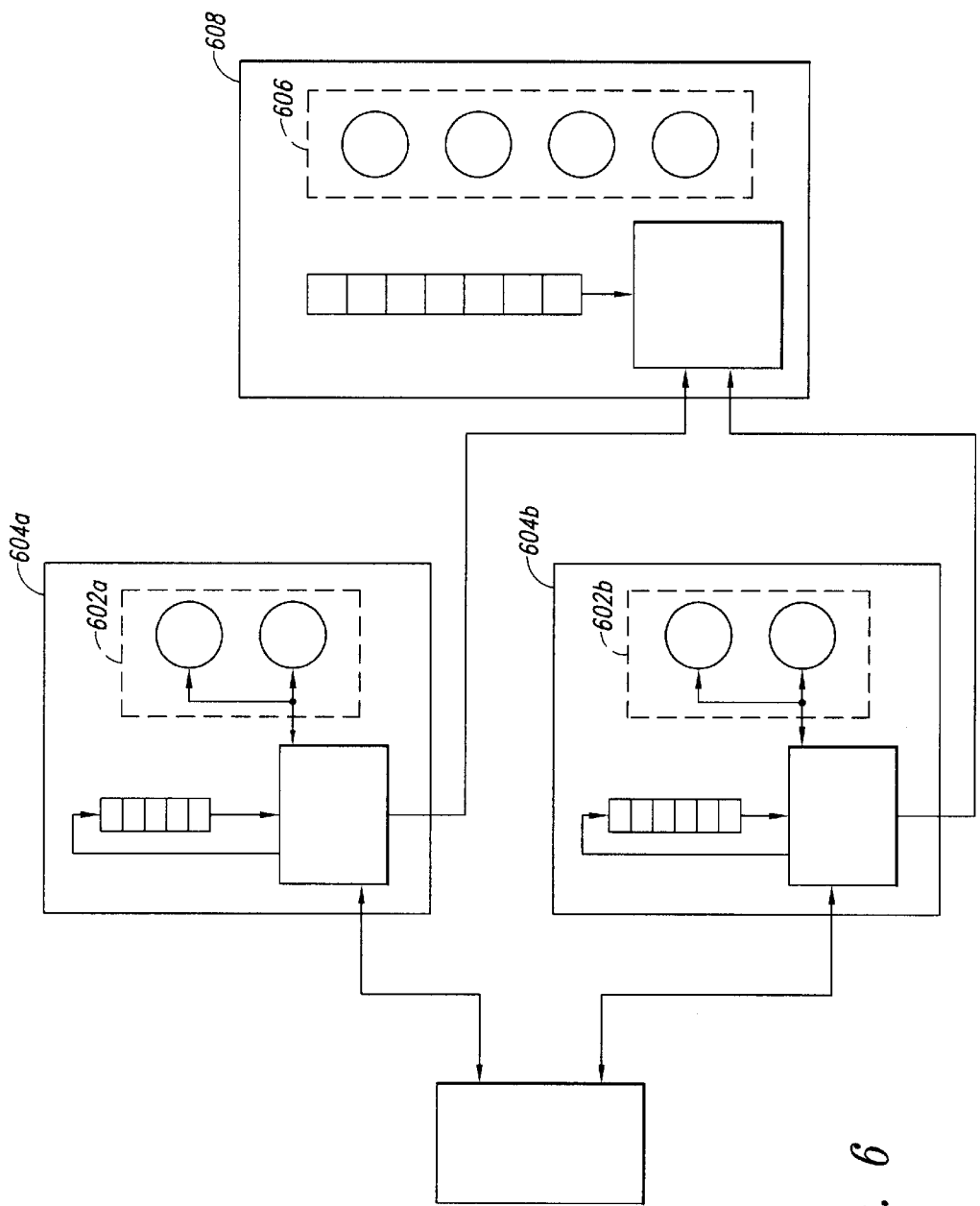
FIG. 6 is a block diagram of a distributed unified data set device group.
Figure 7:
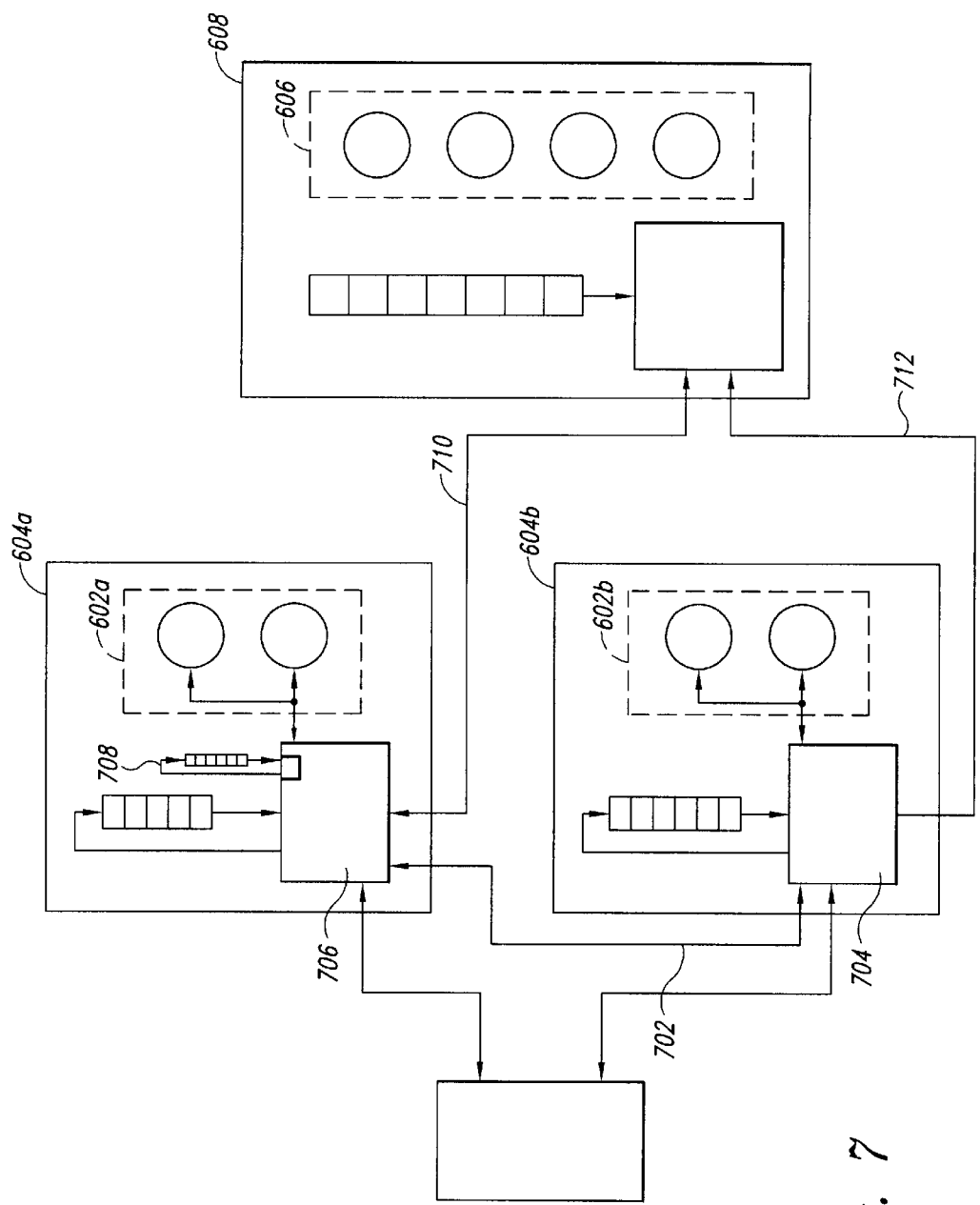
FIG. 7 illustrates a direct communications link and a USN component added to the hardware configuration shown in FIG. 6 in order to provide for data consistency between an IUDSDG and a mirror UDSDG.

FIG. 7 illustrates a direct communications link and a USN component added to the hardware configuration shown in FIG. 6 in order to provide for data consistency between the IUDSDG and a mirror UDSDG. The added direct, vertical communications link 702 links the disk array controller 704 of local disk array 604b to the disk array controller 706 of local disk array 604a. In the system shown in FIG. 7, disk array 604a is designated the supervisor and disk array 604b is designated the subordinate with respect to an IUDSDG 602a–b distributed over disks of local disk arrays 604a–b. A USN component 708 has been added to the disk array controller 706 functionality of the supervisor. Both the subordinate and supervisor disk arrays cooperate by using the USN component 708 to serialize or partially serialize WRITE requests related to the IUDSDG 602a–b generated by the subordinate and supervisor disk arrays 602a–b and directed to the remote disk array 608 that contains the corresponding mirror UDSDG 606. When the controller of either the subordinate or supervisor disk arrays is ready to issue a WRITE request to the mirror UDSDG 606, the controllers first access the USN component 708 to obtain a USN for the WRITE request.

For UDSDGs operating in synchronous mode, the USN component 708 allows only a single USN-associated WRITE request to be pending at any given time, and thus WRITE requests directed to the mirror UDSDG are essentially single threaded through the USN component 708. By serializing the WRITE requests directed to the mirror UDSDG 606, the USN component 708 ensures that the data stored within the mirror UDSDG is consistent with the data state of the IUDSDG distributed between the local disk arrays. Serialization ensures that WRITE requests are not executed against the mirror UDSDG out of order, and no WRITE request is omitted from a sequence of WRITE requests. Thus, the above described problems illustrated using the relational DBMS example are prevented by WRITE request serialization. For UDSDGs operating in asynchronous mode, by contrast, the USN component 708 allows a number of USN-associated WRITE requests, up to some maximum number, to be pending for a particular UDSDG at any given time, and thus WRITE requests directed to the mirror UDSDG are partially serialized. By partially serializing the WRITE requests directed to the mirror UDSDG 606, the USN component 708 ensures that the data states of the UDSDG and mirror UDSDG do not diverge by more than some acceptable level of data state divergence. Synchronous mirroring mode provides for a more up to date fail-over in the event of local UDSDG fail-over, but at the expense of single threading WRITE requests. Asynchronous mirroring mode requires either data check pointing, e.g. via sequence numbering, or a more complex fail-over mechanism, but also provides for greater performance and throughput by not strictly single threading WRITE request execution.

The added direct, vertical communications link 702 also provides alternate routing of WRITE requests from the local disk arrays to the remote disk array. For example, should the horizontal communications link 710 between the supervisor disk array 604a and the remote disk array 608 fail, the supervisor disk array 604a may route mirror WRITE requests through the subordinate disk array 604b to the remote disk array 608 via horizontal communications links 702 and 712. Similarly, if communications link 712 fails, the subordinate array 604b may route WRITE requests to the remote array 608 via supervisor array 604a.

Besides preventing the data consistency problems described above, single-threading of WRITE requests directed to a mirror UDSDG may have the added advantage of throttling one or more faster local disk arrays in order to prevent cache overflows and extremely inefficient I/O request discarding by a remote array to which WRITE requests are directed by a number of local arrays. For example, a remote array may store out-of-sequence I/O requests within a memory buffer, and apply these stored I/O requests following receipt of an out-of-order or delayed I/O request However, if one of a number of local or remote arrays is consistently slower than another similarly disposed array, the cache may continue to grow on the array over time and eventually overflow. If the cache overflows, the local and remote array constituting the mirror commonly discards all cached I/O requests, which must then be regenerated and retransmitted by the local arrays without the benefit of ordering. However, serialization via the USN component of a supervisor ensures that disparities in the rate of WRITE request generation between local arrays cannot lead to cache overflows on the remote array.

Figure 8:
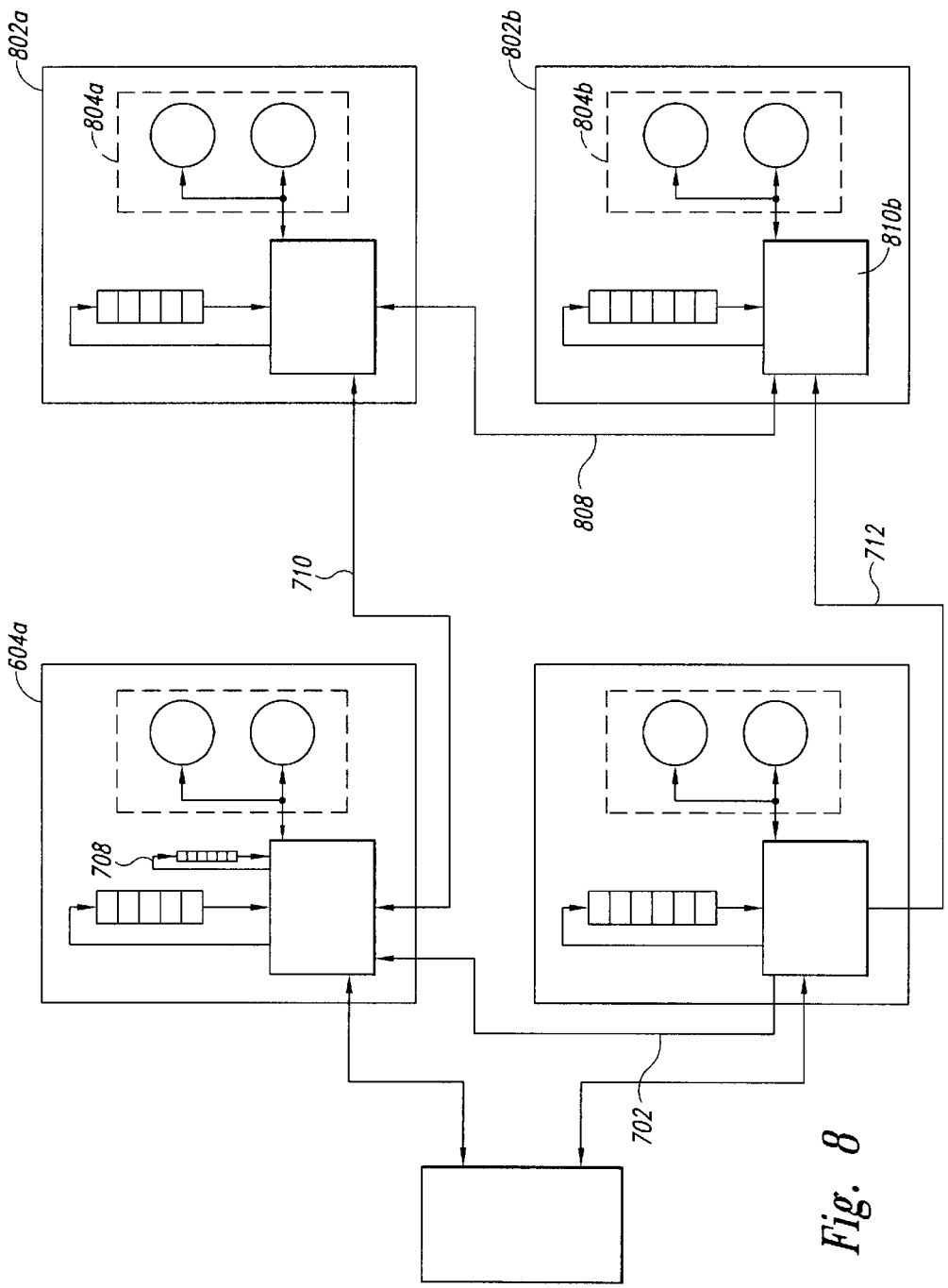
FIG. 8 shows a block diagram of a hardware configuration supporting both an IUDSDG as well as a mirror IUDSDG.

FIG. 8 is a block diagram of a hardware configuration supporting both an IUDSDG as well as a mirror IUDSDG. FIG. 8 is similar to FIG. 7 but, in FIG. 8, the single remote disk array 608 of FIG. 7 has been replaced by two remote disk arrays 802a and 802b. The mirror IUDSDG 804a–b is, in FIG. 8, distributed between the two remote disk arrays 802a–b. A direct, vertical communications link 808 links the controller 810a of remote disk array 802a with the controller 810b of remote disk array 802b. Prior to executing WRITE requests directed to the mirror IUDSDG 804a–b, each controller 810a–b of the remote disk arrays must first determine, when the mirror IUDSDG is operating in asynchronous mode, whether the next WRITE request to be executed is the next WRITE request in the sequence of WRITE requests issued by the local arrays containing the IUDSDG. However, when operating in synchronous mirroring mode, the two controllers 810A–B do not coordinate execution of received WRITE requests, because coordination of execution of the WRITE requests is already provided for by the lock step effect of the USN generated by the supervising local disk array. Again, as in the configuration shown in FIG. 7, additional reliability and robustness is achieved by adding a second direct communications link 808 between the controllers of the remote disk arrays 802A–B. Should either of the conventional horizontal communication links 710 and 712 fail, a WRITE request may nevertheless be routed through vertical communications link 702, the surviving horizontal link, and, if necessary, vertical communications link 808 to the appropriate remote disk array.

In the following paragraphs, operation of the disk controllers of local arrays over which an IUDSDG is distributed is described with reference to a number of flow-control diagrams. This discussion is intended to outline operation of the disk controllers with respect to WRITE requests directed to an IUDSDG and a mirror UDSDG stored on one remote disk array or a mirror IUDSDG stored on two or more remote disk arrays. This discussion is not, however, intended to describe those aspects of operation of the disk controllers unrelated to the present invention or of read requests which do not get mirrored to the remote arrays. It should be noted that there are many different possible ways of implementing control logic within the disk controllers of the local arrays in order to achieve WRITE request serialization by which data consistency is maintained between an IUDSDG and a mirror UDSDG. In this case, data consistency does not imply instantaneously mirroring of data of an IUDSDG to the mirror UDSDG. Instead, the mirror UDSDG or mirror IUDSDG is generally, at any given instant in time, a faithful mirror of a previous data state of the IUDSDG. In other words, the data state of the asynchronous mirror UDSDG may lag behind, by some interval of time, the current data state of the IUDSDG. By serializing WRITE requests under synchronous mirroring, the disk arrays ensure that the data state of the mirror UDSDG is guaranteed to not lag the data state of the IUDSDG in that the reply to the requesting host is held up until the receipt of the write on the remote array has been acknowledged. By sequencing and partially serializing WRITE requests under asynchronous mirroring, the local UDSDG and mirror UDSDG are guaranteed to diverge no further than a maximum divergence, controlled by a credit mechanism to be detailed below.

Figure 9:
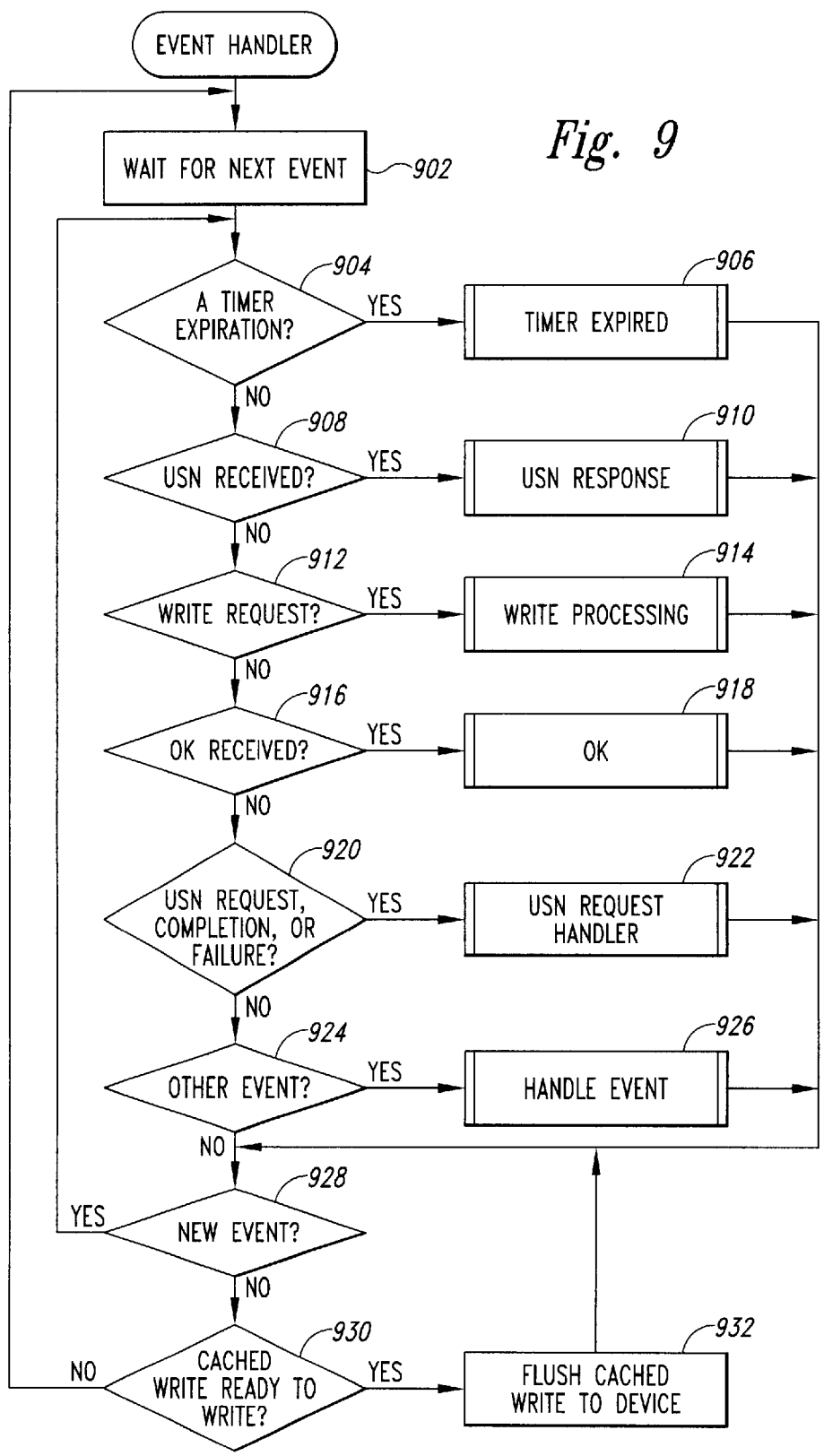
FIG. 9 is a flow-control diagram for a general event handler routine that runs within each local disk array.

FIG. 9 is a flow-control diagram for a general event handler routine that is executed by the controller within each local disk array. In step 902, the routine "event handler" waits for the next event associated with WRITE request processing for an IUDSDG. When a next event occurs, control flows to step 904, in which the routine "event handler" determines whether a timer expiration has occurred. If so, then the routine "timer expired," to be discussed below, is called in step 906. Otherwise, the routine "event handler" determines, in step 908, whether the event is reception of a response from a USN component, either from within the local disk array, in the case of a supervisor local disk array, or from the USN component of another local disk array, in the case of a subordinate local disk array. If a response from a USN component has been received, then the routine "USN response" is called in step 910. Otherwise, in step 912, the routine "event handler" determines whether a WRITE request has been received. If so, then the routine "Write processing" is called in step 914. Otherwise, in step 916, the routine "event handler" determines whether an OK message has been received. If so, then the routine "OK" is called in step 918. Otherwise, in step 920, in the case of a supervisor local disk array, the routine "event handler" determines whether a message directed to the USN component has been received. If so, then, in step 922, the routine "USN request handler" is called. If some other type of event has occurred, as detected by the routine "event handler" in step 924, then a second event handling routine is called in step 926. Other types of events may include error events and events not related to IUDSDG WRITE processing, which are beyond the scope of the current discussion. After the current event has been handled, the routine "event handler" determines, in step 928, if another event has occurred during processing of the current event. If so, then control flows back to step 904. If not, then, in step 930, the routine "event handler" determines whether any cached WRITE requests are ready for writing to a local disk. If so, then one or more of these cached WRITE requests are flushed and written to the appropriate location of a local disk in step 932. When no new events remain to be handled, and all cached WRITE requests ready for writing to disks have been flushed from cache and written to disk, then control flows back to step 902 where the routine "event handler" waits for a next event to occur.

Figure 10:
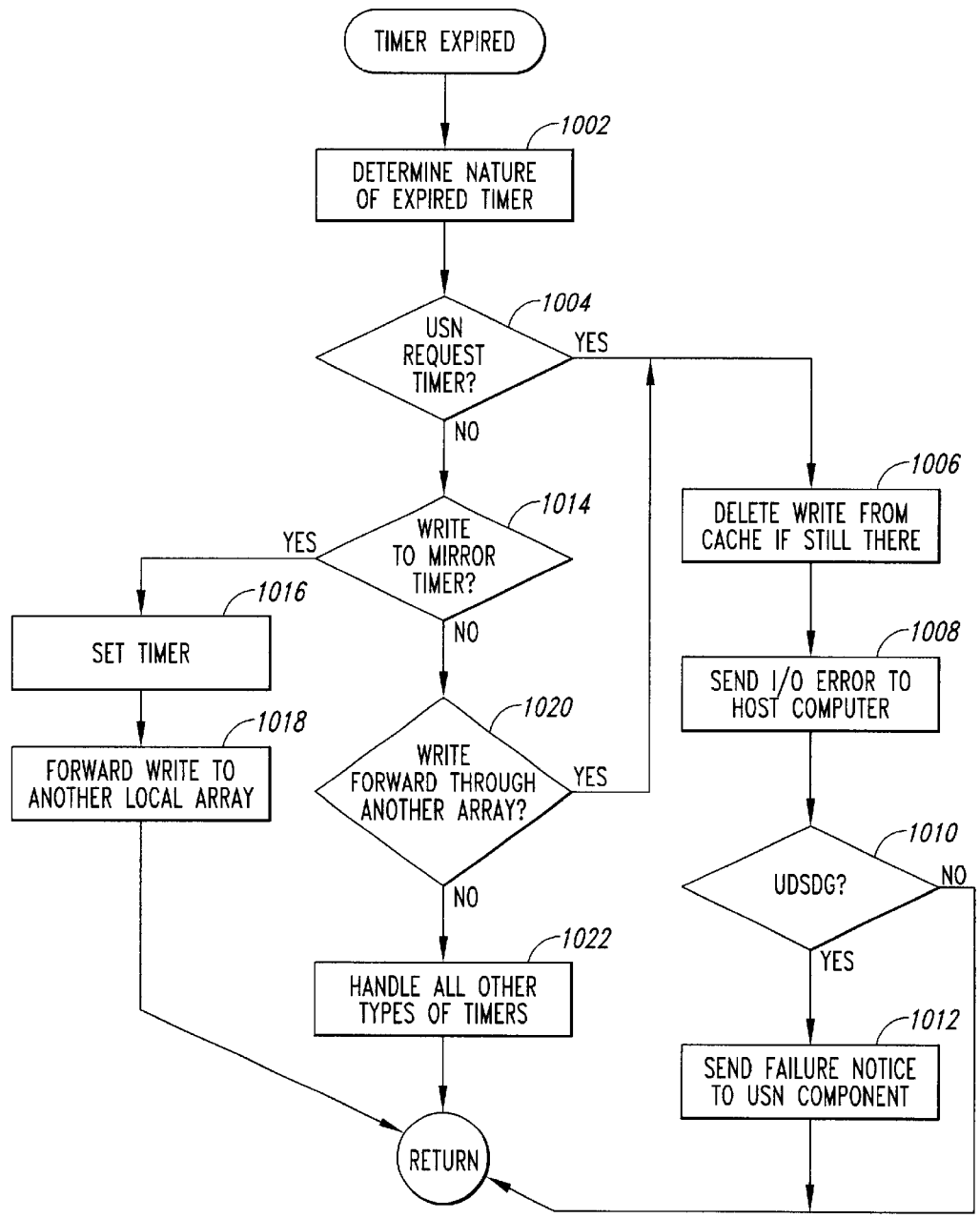
FIG. 10 is a flow-control diagram of the routine "timer expired," called in step 906 of FIG. 9.

FIG. 10 is a flow-control diagram for the routine "timer expired," called in step 906 of FIG. 9. The routine "timer expired" is called to handle timer expiration events. In step 1002, the routine "timer expired" determines the type of timer that is expired. If the expired timer is a timer set during requesting of a unified sequence number ("USN") from the USN component of a supervisor local disk array, as detected in step 1004, then the local disk array controller deletes, in step 1006, the corresponding WRITE request from cache, in the case that the WRITE request is still resident in cache, sends an error message to the host computer that generated the WRITE request in step 1008, and, if the WRITE request was directed to a UDSDG, as detected in step 1010, sends a failure notice to the USN component from which the USN was requested in step 1012. If the expired timer was initially set during forwarding of a WRITE request to a remote disk array for mirroring, as detected in step 1014, then the controller of the local disk array sets a timer in step 1016 and forwards the WRITE request, via a vertical link, to another local disk array in step 1018. The local disk array to which the WRITE request is forwarded may then be able to forward the WRITE requests to the remote disk array via a horizontal communications link unavailable to the current local disk array. If the expired timer was set in step 1018 during handling of a previous expired timer, as detected in step 1020, then control flows to step 1006 and 1008, both previously described, in which the local disk array controller deletes the corresponding WRITE request in cache and returns an error message to the host computer that generated the WRITE request. If the expired timer is of any other type, including types unrelated to IUDSDG WRITE processing, then the expired timer is handled by a more specific timer expiration handling routine called in step 1022. Thus, as discussed above with reference to FIG. 7 and 8, the vertical communications links added between local disk arrays and between remote disk arrays can be used to direct WRITE requests from a local array to a remote disk array when a horizontal link between the local disk array and the remote disk array has failed.

Figure 11:
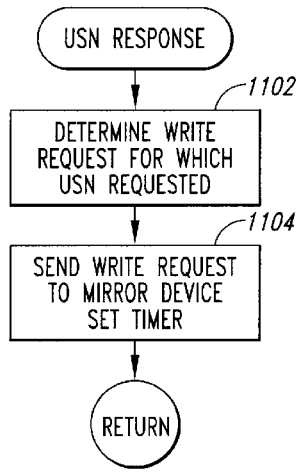
FIG. 11 is a flow-control diagram for the routine "USN Response" called in step 910 of FIG. 9.

FIG. 11 is a flow-control diagram for the routine "USN response" called in step 910 of FIG. 9. The routine "USN response" is called by the event handler routine running on a local disk array when the local disk array receives a USN response from a USN component. The USN component may be internal, in the case of a supervisor local disk array, or, in the case of a subordinate local disk array, resides in another local disk array. In step 1102, the local disk array controller determines which mirror WRITE request corresponds to the received USN. In step 1104, the local disk array controller sends this mirror WRITE request to a remote disk array that contains the mirror LUN for the mirror WRITE request, and sets a timer corresponding to transmission of the mirror WRITE request to the remote disk array.

Figure 12:
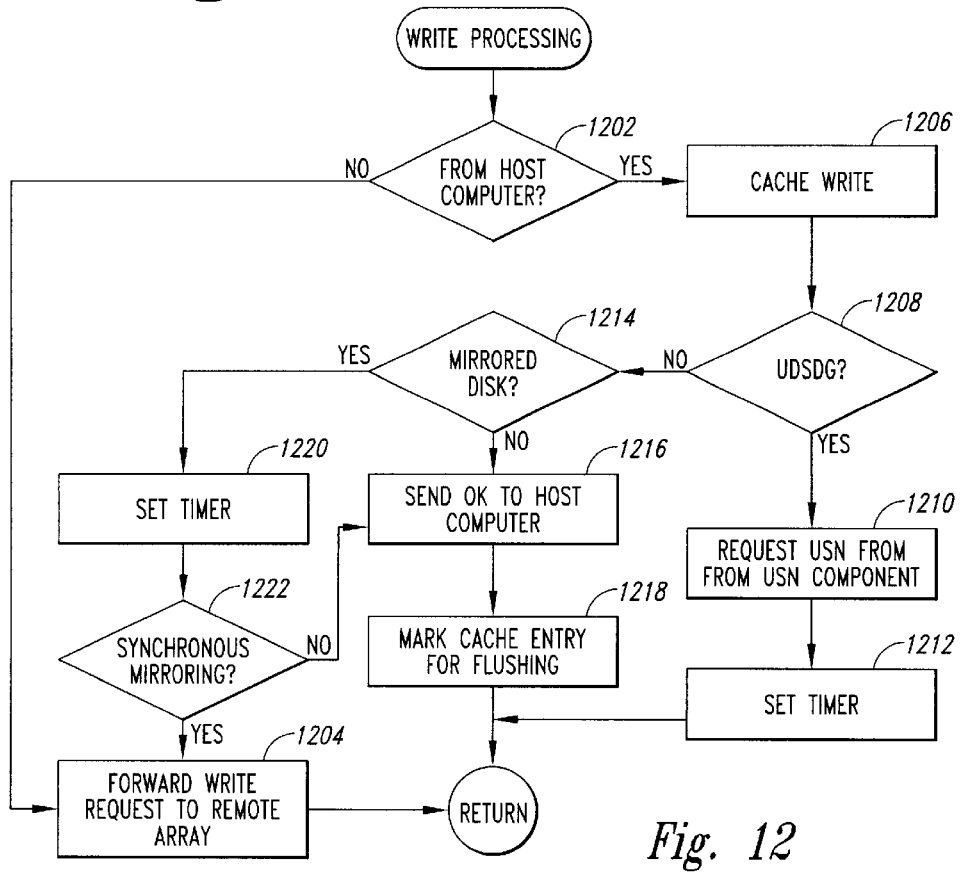
FIG. 12 is a flow-control diagram for the routine "WRITE processing," called in step 914 of FIG. 9.

FIG. 12 is a flow-control diagram for the routine "WRITE processing," called in step 914 of FIG. 9. The routine "WRITE processing" handles WRITE requests received by a local disk array from either a host computer or from another local disk array seeking to reroute a WRITE request directed to a remote disk array around a failed horizontal communications link. In step 1202, the routine "WRITE processing" determines whether the received WRITE request was sent by a host computer. If not, then the received WRITE request was forwarded by another local disk array to the current local disk array in order to reroute the WRITE request around a failed horizontal communications link. In this case, the current local disk array, in step 1204, forwards the WRITE request to the remote disk array to which the current local disk array is linked. Note that, in certain embodiments, rerouting of WRITE requests requires that an additional destination address be placed somewhere within the communications message including the WRITE request so that the remote disk array that receives a rerouted WRITE request can determine whether it is the intended recipient, or whether the remote disk array needs to forward the WRITE request to another remote disk array via a vertical communications link. If, on the other hand, the WRITE request was received from a host computer, then the local disk array controller caches the WRITE request in memory for later transfer to disk, in step 1206. After caching the WRITE request, the local disk array controller determines whether the WRITE request is directed to a UDSDG or IUDSDG in step 1208. If the WRITE request is directed to a UDSDG or IUDSDG, then, in step 1210, the local disk array controller requests a USN from the USN component of the supervisor local disk array for the UDSDG or IUDSDG. In some cases, the local disk array controller may be the supervisor, in which case the request for a USN is directed to an internal USN component. In other cases, the request for a USN must be directed through a vertical link to another local disk array. Following requesting of a USN, a local disk array controller sets a timer, in step 1212, to expire in case the requested USN is not returned by the USN component within a reasonable length of time. If the WRITE request is not directed to a UDSDG or IUDSDG, then, in step 1214, the local disk array controller determines whether the disk to which the WRITE request is directed is a mirror disk. If not, then the local disk array controller sends, in step 1216, an OK response message to the host computer from which the WRITE request was received and marks the cache entry ready for flushing in step 1218. If, on the other hand, the disk to which the WRITE request is directed is a mirror disk, then, in step 1220, the local disk array controller sets a timer corresponding to the WRITE request. If the mirroring mode for the disk is synchronous, as detected in step 1222, then the WRITE request is forwarded to a remote disk array in step 1204. Otherwise, in the case of asynchronous mirroring mode, the local disk array controller sends an OK message to the host computer in step 1216 and marks the cached WRITE request as eligible for flushing in step 1218.

Figure 13:
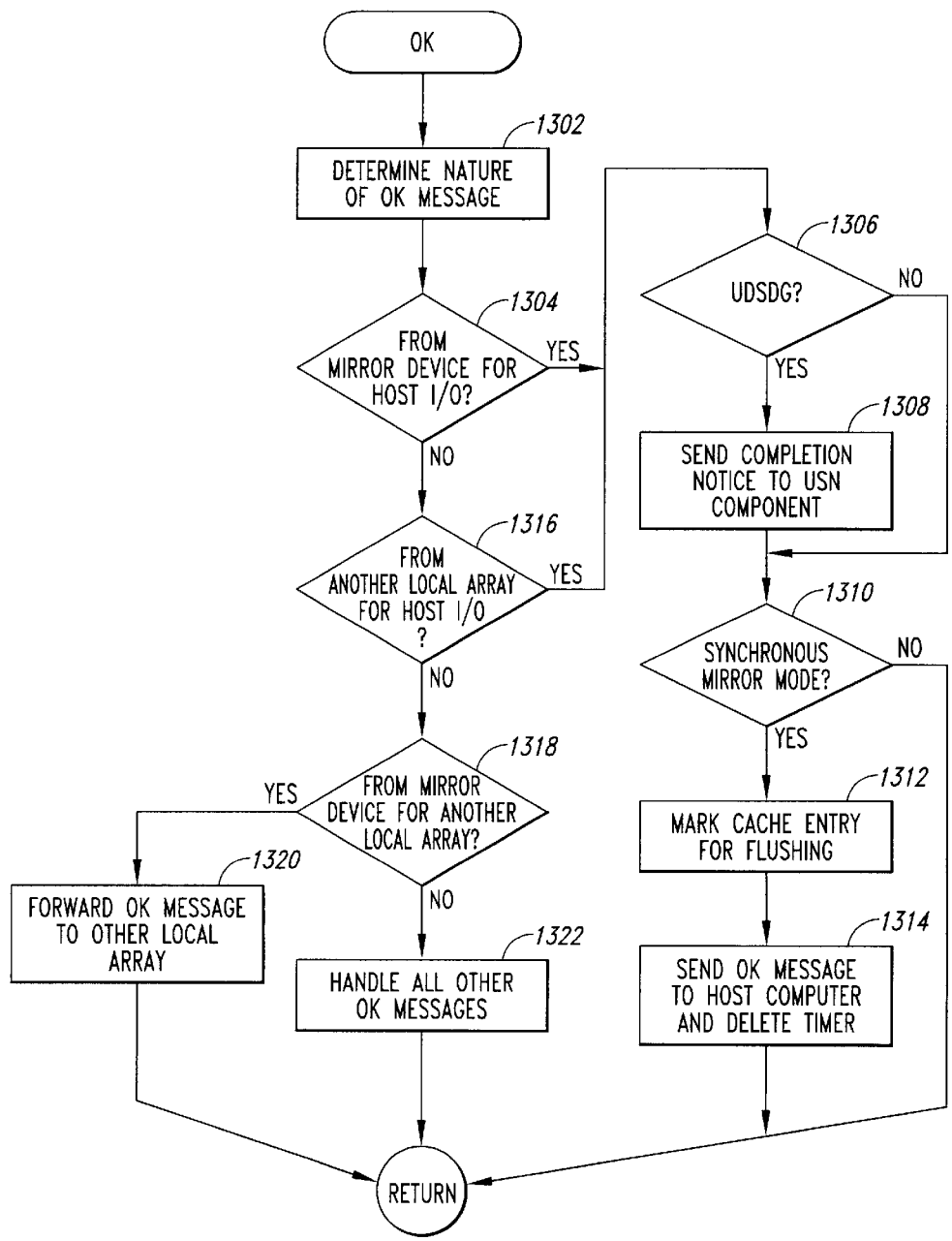
FIG. 13 is a flow-control diagram for the routine "OK," called from step 918 in FIG. 9.

FIG. 13 is a flow-control diagram for the routine "OK," called from step 918 in FIG. 9. The routine "OK" is called by local array controller in order to handle various types of OK messages received by the local disk array controller. In step 1302, the routine "OK" determines the nature of the received OK message. If, as detected in step 1304, the OK messages was received from a remote disk array that is the mirror device for a disk located within the local disk array, and to which the local disk array directed a mirror WRITE request as part of processing a WRITE request received from a host computer, then control flows to step 1306. In step 1306, the routine "OK" determines whether the original WRITE request received from the host computer is directed to a UDSDG or IUDSDG. If so, then in step 1308, the routine "OK" sends a completion message to the USN component from which the local disk array controller received the USN associated with the mirror WRITE request. Next, the local disk array controller, in step 1310, determines whether the mirror WRITE was directed to the remote disk array under synchronous mirroring mode or asynchronous mirroring mode. If under asynchronous mirroring mode, nothing further remains to be done. However, if the WRITE request was directed to the remote disk array under synchronous mirroring mode, then the local disk array controller marks the cache entry corresponding to the WRITE request in the local disk array cache as ready for flushing, in step 1312, sends an OK message to the host computer and deletes the timer associated with the WRITE request in step 1314. If the received OK message was received from another local disk array due to the OK message being routed around a failed horizontal communications link by a mirroring device, as detected in step 1316, then control flows to step 1306, just as in the case where the OK message was received directly from the mirroring device, as detected in step 1304. If, on the other hand, the OK message was received from a remote disk array, but is directed to a local disk array different from the current disk array, as detected in step 1318, then the current local disk array forwards the OK message to the local disk array to which the OK message is directed, in step 1320. Thus, a local disk array may received rerouted messages directed to the local disk array via another local disk array or may receive messages from a remote disk array intended for another local disk array. Thus, steps 1316 and 1318 are involved in the additional reliability and robustness mechanisms that make use of the additional vertical communication links between local disk arrays and remote disk arrays that represents one aspect of the present invention. All other types of OK messages, including OK messages not related to IUDSDGs, are handled in step 1322.

Figure 14:
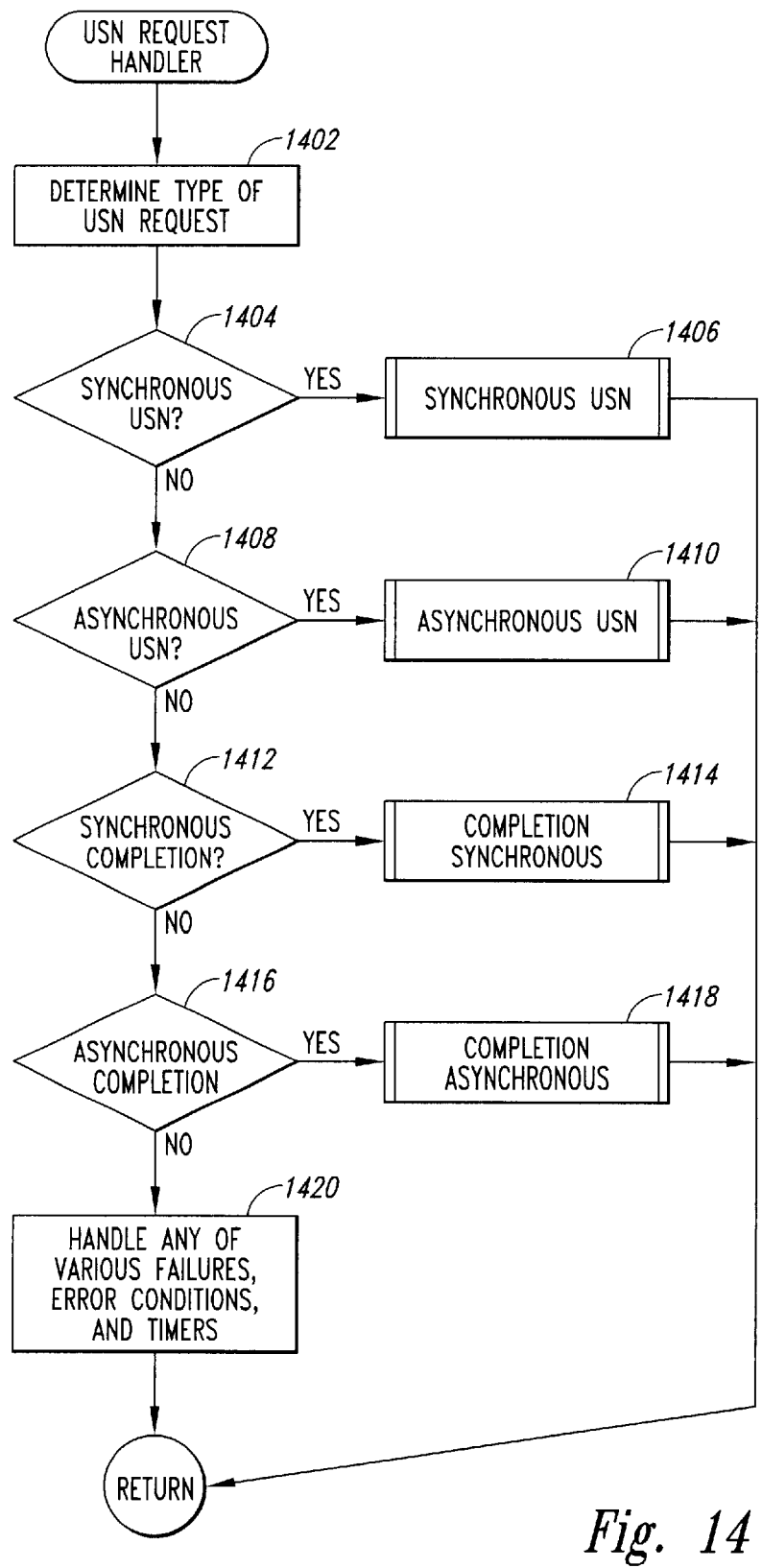
FIG. 14 is a flow-control diagram for the routine "USN request handler," called from step 922 in FIG. 9.

FIG. 14 is a flow-control diagram for the routine "USN request handler," called from step 922 in FIG. 9. This routine represents the USN component of a supervisor local disk array. In step 1402, the USN component determines the type of USN request received. If the received request is a request for a USN for synchronous mode mirroring, as detected in step 1404, then the routine "synchronous USN" is called in step 1406. If the received USN request is a request for a USN under asynchronous mirroring mode, as detected in step 1408, then the routine "asynchronous USN" is called in step 1410. If the received USN request is a completion message for a USN-associated mirror WRITE under synchronous mirroring mode, as detected in step 1412, then the routine "completion synchronous" is called in step 1414. If the USN request received is a completion message sent with respect to a mirror WRITE under asynchronous mirroring mode, as detected in step 1416, then the routine "completion asynchronous" is called in step 1418. All other types of USN requests, including various failure messages and error conditions, are handled in step 1420. The failure condition and error handling routines are beyond the scope of the current discussion.

Figure 15:
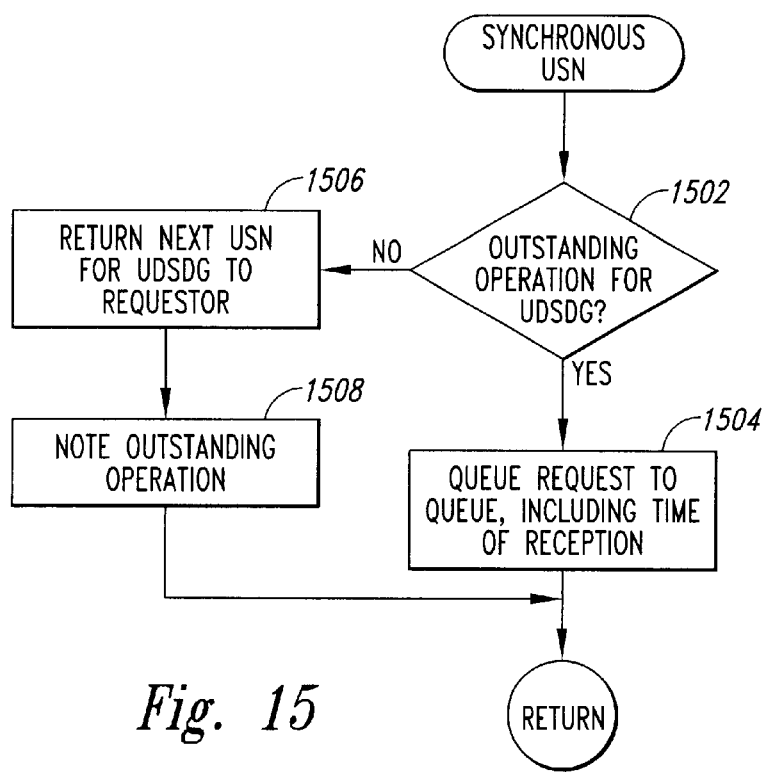
FIG. 15 is a flow-control diagram for the routine "synchronous USN," called in step 1406 of FIG. 14.

FIG. 15 is a flow-control diagram for the routine "synchronous USN," called in step 1406 of FIG. 14. In step 1502, the routine "synchronous USN" determines whether there is currently an outstanding mirror WRITE request for the UDSDG for which the USN is requested. If there is an outstanding mirror WRITE operation, then the USN request is queued by the USN component in step 1504. Thus, as discussed above, the issuance of mirror WRITE requests is single threaded under synchronous mirroring mode by this mechanism. If there is no outstanding mirror WRITE operation for the UDSDG for which the USN is requested, then the USN component, in step 1506, returns the next highest USN for the UDSDG to the requester and, in step 1508, presents an indication that a mirror WRITE request is outstanding for the UDSDG. Thus, the USN component single threads mirror WRITE requests with respect to each UDSDG.

Figure 16:
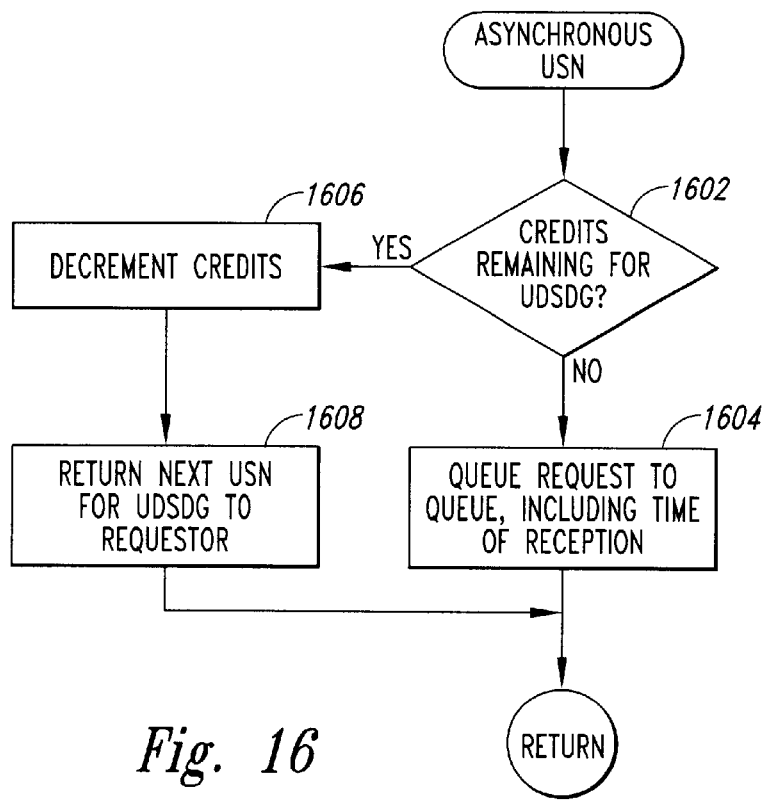
FIG. 16 is a flow-control diagram for the routine "asynchronous USN," called in step 1410 of FIG. 14.

FIG. 16 is a flow-control diagram for the routine "asynchronous USN," called in step 1410 of FIG. 14. In step 1602, the USN component of the local disk array controller determines whether there are any remaining credits for the UDSDG for which the USN is requested. If not, then, in step 1604, the USN component queues the USN request. As explained above, under asynchronous mirroring mode, mirror WRITE requests are not single threaded, but instead some number of mirror WRITE requests up to a maximum number of mirror WRITE requests are allowed to proceed concurrently. The credit mechanism implements this policy. If there are credits remaining, then the USN component decrements the remaining credits for the UDSDG in step 1606 and returns the next USN for the UDSDG to the requester in step 1608.

Figure 17:
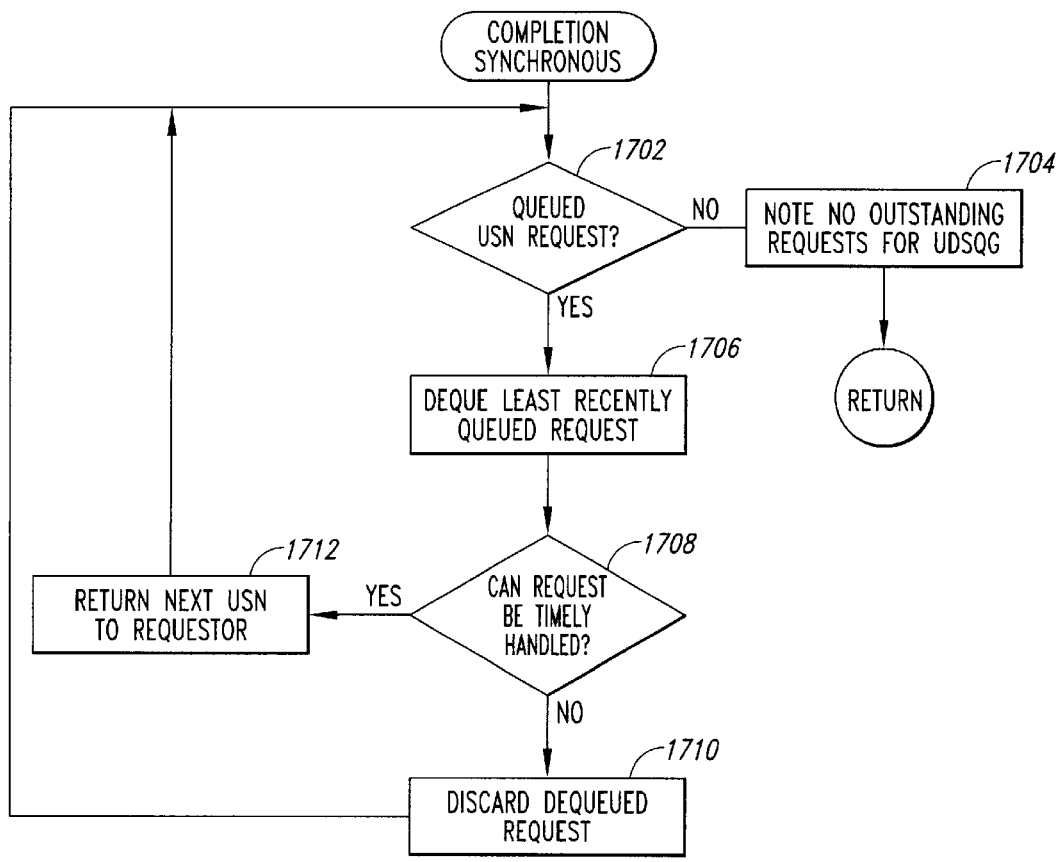
FIG. 17 is a flow-control diagram for the routine "completion synchronous," called from step 1414 in FIG. 14.

FIG. 17 is a flow-control diagram for the routine "completion synchronous," called from step 1414 in FIG. 14. This routine handles completion messages sent to the USN component upon completion of mirror WRITE requests under synchronous mirroring mode. In step 1702, the local disk array controller determines whether there are any queued USN requests outstanding for the UDSDG. If not, the USN component sets an indicator indicating that there no outstanding mirror WRITE requests for the UDSDG in step 1704. Otherwise, the USN component dequeues the least recently queued USN request from the queue in step 1706. The USN component determines, from a stored indication of the time that the dequeued USN component was queued, whether or not the mirror WRITE can be timely handled by the local disk array to which a USN is to be returned in step 1708. If the mirror WRITE request cannot be completed before timer expiration, then the USN component discards the dequeued request in step 1710. Otherwise, the USN component returns the next USN for the UDSDG to the requester in step 1712.

Figure 18:
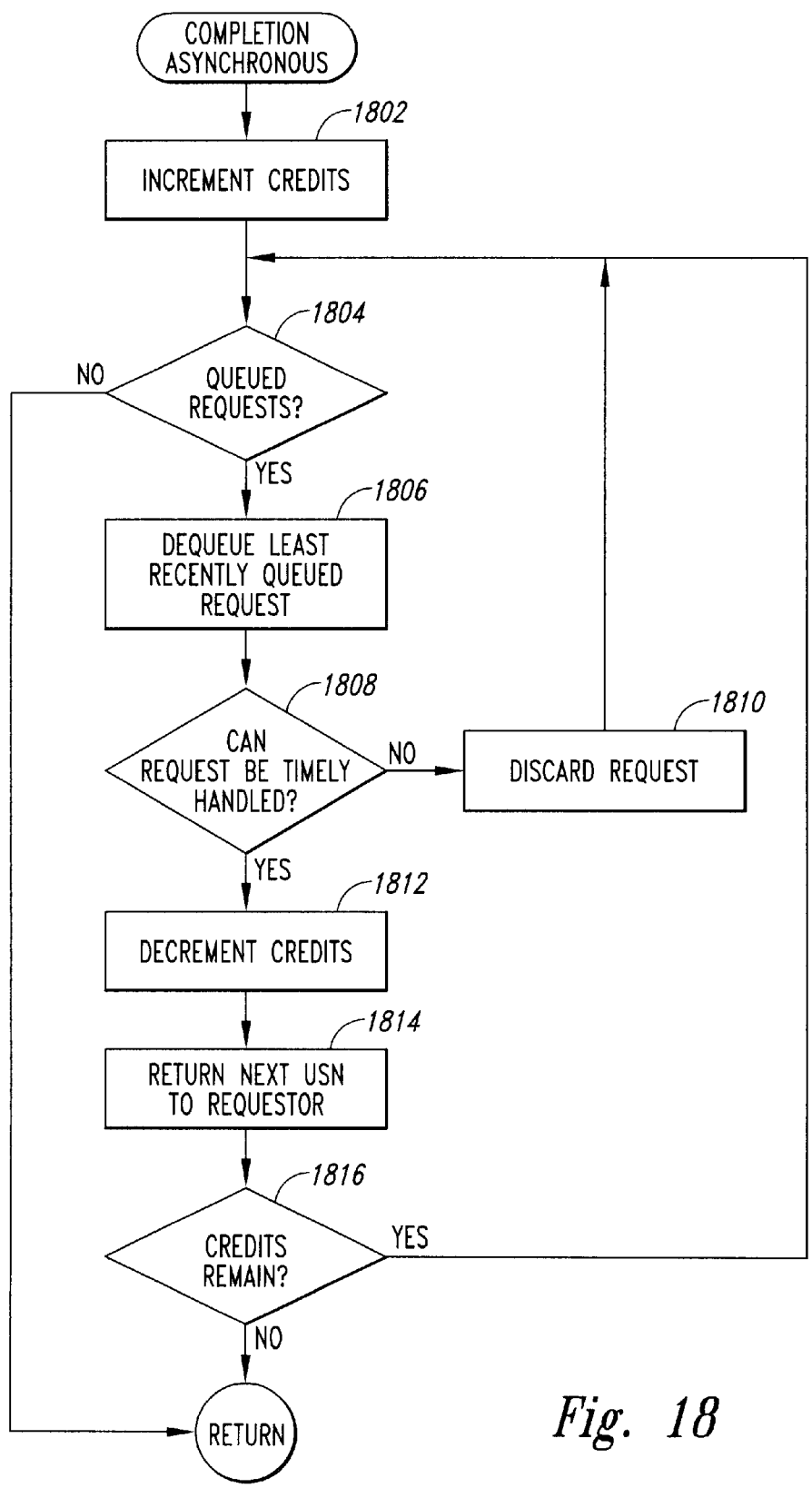
FIG. 18 is a flow-control diagram for the routine "completion asynchronous," called in step 1418 of FIG. 14.

FIG. 18 is a flow-control diagram for the routine "completion asynchronous," called in step 1418 of FIG. 14. This routine handles completion messages sent for completed mirror WRITE requests by local disk array controllers under asynchronous mirroring mode. In step 1802, the USN component increments the number of credits available for the UDSDG associated with the completed mirror WRITE request. Next, in step 1804, the USN component determines whether there are any queued USN requests for the UDSDG. If so, then in step 1806, the USN dequeues the least recently queued USN request and determines, in step 1808, if the mirror WRITE operation corresponding to the USN request can still be timely handled. If not, then the dequeued USN request is discarded in step 1810. Otherwise, the USN component decrements the credits allotted to the UDSDG in step 1812 and returns the next USN for the UDSDG to the requester in step 1814. If no credits remain, as detected by the USN component in step 1816, then the routine "completion asynchronous" returns. Otherwise, control flows back to step 1804.

Figure 19:
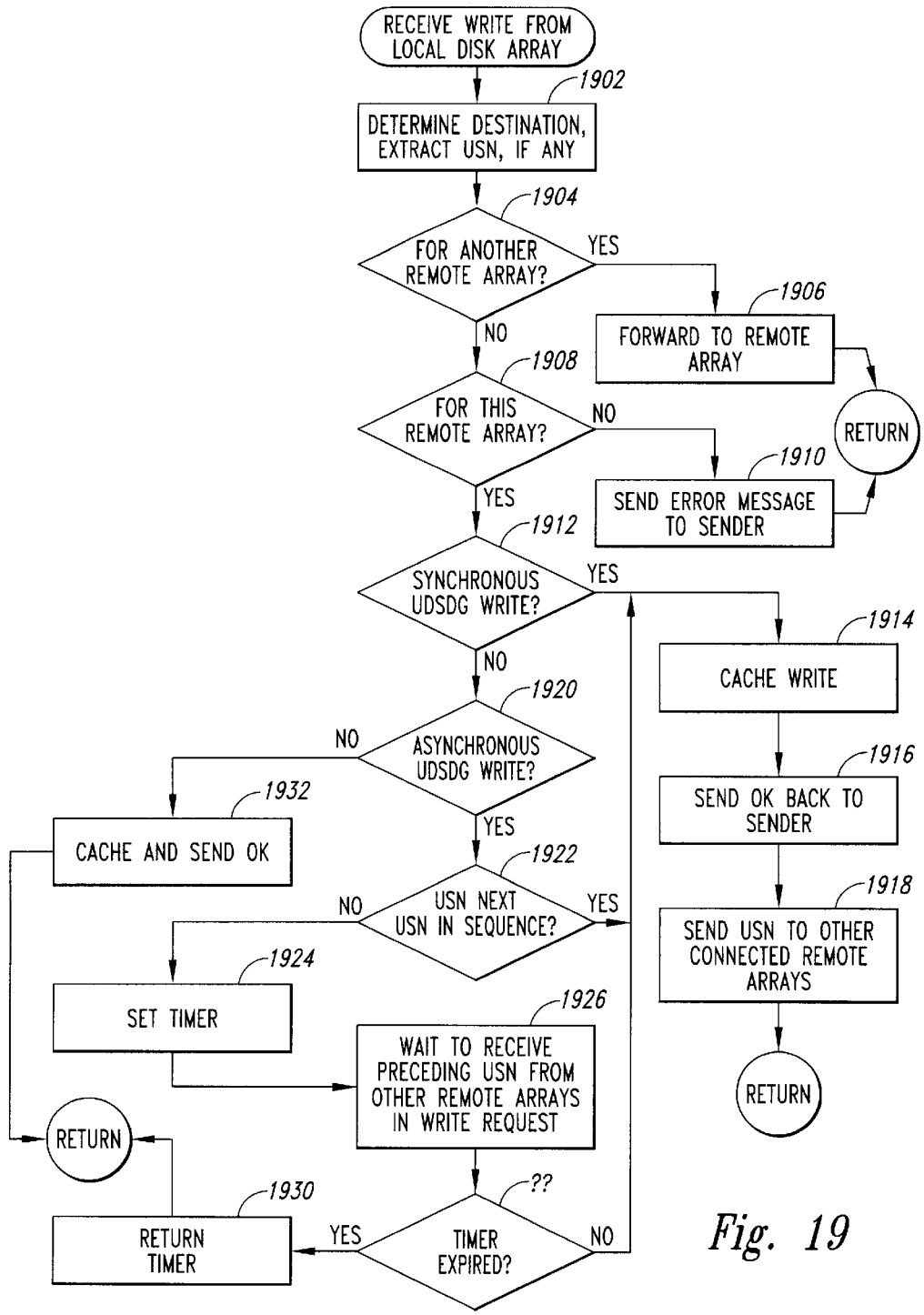
FIG. 19 is a flow-control diagram for the routine "receive WRITE from local disk array" that runs on a remote disk array containing all or a portion of a mirror IUDSDG.

FIG. 19 is a flow-control diagram for the routine "receive WRITE from local disk array" that runs on a remote disk array containing all or a portion of a mirror IUDSDG. This routine handles IUDSDG-related mirror WRITE requests. In step 1902, the remote disk array controller determines the destination of the received mirror WRITE request, and extracts any USN included within the WRITE request. If the mirror WRITE requests is intended for another remote disk array, as detected in step 1904, then the remote disk array controller forwards the WRITE request to the remote disk array to which it is intended in step 1906. Again, this allows mirror WRITE requests to be rerouted around failed links between local disk arrays and remote disk arrays. If the received mirror WRITE request is not directed to the current remote disk array, and, since step 1904 has already been executed, is not directed to another remote disk array, as detected in step 1908, then the current remote disk array controller sends an error message back to the sender in step 1910. If the mirror WRITE request is directed to a mirror UDSDG under synchronous mirroring mode, as detected by the remote disk array controller in step 1912, then the remote disk array controller caches the mirror WRITE in step 1914, sends an OK message back to the local disk array from which the mirror WRITE request was received in step 1916, and sends the USN extracted from the mirror WRITE request to other remote arrays to which the current remote disk array is connected, in step 1918. If, on the other hand, the received mirror WRITE request is directed to a UDSDG or asynchronous mirroring mode, as detected in step 1920, then the remote disk array controller determines whether the extracted USN is the next USN following the most current USN that the remote disk array controller knows of, either from receiving USNs reported by other remote disk array controllers to a current remote disk array controller, or by having extracted the USN in the course of handling received mirror WRITE requests. If the extracted USN is the next USN in the sequence for the UDSDG, as detected in step 1922, then the mirror WRITE request is cached, an OK message is sent back to the sender, and the expected USN is reported to other remote disk arrays to which the current remote disk array is connected in steps 1914, 1916, and 1918. Otherwise, the remote disk array controller sets a timer, in step 1924, and waits, in step 1926, to receive reports of the preceding USN from another remote disk array or in a subsequently handled WRITE request in step 1926. If the set timer expires, as detected in step 1928, then an error message is returned to the local disk array that sent the mirror WRITE request in step 1930. Otherwise, when the preceding USN is received, the mirror WRITE request is cached, an OK message is sent back to the sender of the mirror WRITE request, and the USN is reported to other remote disk arrays, in step 1914, 1916, and 1918. When the remote disk array controller cannot determine that the received mirror WRITE request is not directed to a mirror IUDSDG, then the mirror WRITE is cached and an OK message sent back to the local disk array controller from which the mirror WRITE request was received, in step 1932.

Although the present invention has been described in terms of a particular embodiment, it is not intended that the invention be limited to this embodiment. Modifications within the spirit of the invention will be apparent to those skilled in the art. For example, the described embodiments related to UDSDGs distributed over two local disk arrays, and to mirror UDSDGs distributed over two remote disk arrays. UDSDGs and mirror UDSDGs may be distributed over more than two disk arrays, with one of the multiple disk arrays designated as the supervisor. The multiple disk arrays may, in a preferred embodiment, be linked together via separate or shared communications links. In the above-described embodiments, separate physical communications links are established between local disk arrays and remote disk arrays across which UDSDGs and mirror UDSDGs are distributed. However, in an alternative embodiment, the techniques of the present invention may be practiced provided that host computers and multiple disk arrays are interconnected via a fibre channel fabric or other such communications medium that allows direct communications between disk arrays. As with any hardware, firmware, or software implementation, there are an almost limitless number of possible ways to implement control logic in order to practice the present invention. The above-described embodiments were devised for simplicity of description and illustration, but many other embodiments are possible. Many different types of fail-over and error handling strategies may be devised to overcome intermittent failures and complete failures of communications links, disk drives, and disk array controllers. These complex techniques are beyond the scope of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A data-consistent, distributed unified data set device group that stores a distributed unified data set, the distributed unified data set device group comprising:
   a first data storage component, within a first supervisor local data-storage array, that stores a first portion of the distributed unified data set, the first supervisor local data-storage array receiving WRITE requests directed to the first portion of the distributed unified data set from a host computer via a communications medium, the first supervisor local data-storage array including a controller that executes a unified sequence number component that provides sequence numbers for WRITE requests directed to the data-consistent, distributed unified data set device group and that executes controller functionality for receiving, carrying out, and responding to WRITE requests received from a host computer;
   a second data storage component, within a second subordinate local data-storage array, that stores a second portion of the distributed unified data, the second subordinate local data-storage array, the second subordinate local data-storage array including a controller that executes controller functionality for receiving, carrying out, and responding to WRITE requests received from a host computer; and
   a mirror unified data set that mirrors the distributed unified data set stored on one or more remote data-storage arrays.

2. The data-consistent, distributed unified data set of claim 1 wherein the controller functionality of a local data-storage array for receiving, carrying out, and responding to WRITE requests received from a host computer, upon receiving a WRITE request directed to a portion of the distributed unified data set contained within a data-storage component of the local data-storage array, transmits a mirror WRITE request to the one or more remote data-storage arrays, including in the mirror WRITE a unified sequence requested by the controller functionality from the unified-sequence-number component executed by the controller of the supervisor local data-storage array.

3. The data-consistent, distributed unified data set of claim 2 wherein, when the unified-sequence-number component of the supervisor local data-storage array receives a request for a unified sequence number to include in a mirror WRITE request directed to the mirror unified data set, the unified-sequence-number component of the supervisor local data-storage array
   determines whether a mirror WRITE request directed to the mirror unified data set is currently pending, and
   when a mirror WRITE request directed to the mirror unified data set is currently pending, queues the request for a unified sequence number to a unified sequence number request queue, and
   when a mirror WRITE request directed to the mirror unified data set is not currently pending, returns a next unified sequence number to the controller of a local data-storage array.

4. The data-consistent, distributed unified data set of claim 2 wherein, when the unified-sequence-number component of the supervisor local data-storage array receives a request for a unified sequence number to include in a mirror WRITE request directed to the mirror unified data set, the unified-sequence-number component of the supervisor local data-storage array:
   determines whether a maximum number of mirror WRITE requests directed to the mirror unified data set are currently pending, and
   when a maximum number of mirror WRITE requests directed to the mirror unified data set are currently pending, queues the request for a unified sequence number to a unified sequence number request queue, and
   when a maximum number of mirror WRITE requests directed to the mirror unified data set are not currently pending, increments a count of pending mirror WRITE requests, and returns a next unified sequence number to the controller of a local data-storage array.

5. The data-consistent, distributed unified data set of claim 2
   wherein the first supervisor local data-storage array is coupled to a first communications medium that links the first supervisor local data-storage array to a host computer;
   wherein the second subordinate local data-storage array is coupled to a second communications medium that links the second subordinate local data-storage array to a host computer;
   wherein the first supervisor local data-storage array is coupled to a third communications medium that links the first supervisor local data-storage array to a remote data-storage array to which the first supervisor local data-storage array transmits mirror WRITE requests; and wherein the second subordinate local data-storage array is coupled to a fourth communications medium that links the second subordinate local data-storage array to a remote data-storage array to which the second subordinate local data-storage array transmits mirror WRITE requests.

6. The data-consistent, distributed unified data set of claim 2 wherein the first and second communications media are a single communications medium.

7. The data-consistent, distributed unified data set of claim 2 wherein the first, second, third, and fourth communications media are a single communications medium.

8. The data-consistent, distributed unified data set of claim 2 wherein the first supervisor local data-storage array and the second subordinate local data-storage array are coupled to a vertical communications medium that allows the first supervisor local data-storage array and the second subordinate local data-storage array to exchange unified sequence number requests and responses.

9. The data-consistent, distributed unified data set of claim 8 wherein, when a communications medium linking a particular local data-storage array to a remote data-storage array fails, the particular local data-storage array transmits a mirror WRITE request to the remote data-storage array by forwarding the mirror WRITE request to the other local data-storage array via the vertical communications medium, the other local data-storage array then forwarding the mirror WRITE request to the remote data-storage array.

10. The data-consistent, distributed unified data set of claim 2 wherein, when a remote data-storage array receives a mirror WRITE request, the remote data-storage array:
   extracts a unified sequence number from the mirror WRITE request;
   determines whether the extracted unified sequence number is a next sequence number for the mirror unified data set;
   when the extracted unified sequence number is a next sequence number for the mirror unified data set, carries out the WRITE request and sends the extracted unified sequence number to all other remote data-storage arrays; and
   when the extracted unified sequence number is not a next sequence number for the mirror unified data set, waits to execute the WRITE request until the remote data-storage array detects a preceding unified sequence number.

11. The data-consistent, distributed unified data set of claim 10 wherein a remote data-storage array detects a preceding unified sequence number by extracting the preceding unified sequence number from a received mirror WRITE request or by receiving the preceding unified sequence number from another remote data-storage array.

12. The data-consistent, distributed unified data set of claim 1 wherein, when the distributed unified data set is distributed over multiple local data storage arrays, one of the local data storage arrays is a supervisor data storage array and includes a unified sequence number component and the remaining local data storage arrays are subordinate local data storage arrays.

13. The data-consistent, distributed unified data set of claim 1 wherein the local data storage arrays and remote data storage arrays are disk arrays that include two or more disk drives.

14. A method for maintaining data consistency between a unified data set distributed over two or more local data storage arrays, each containing a controller and each coupled to a communications medium, and a mirror unified data set stored on one or more remote data storage arrays, each containing a controller and coupled to a communications medium, the method comprising:
   designating one of the local data storage arrays as a supervisor local data storage array, and designating the remaining local data storage arrays as subordinate local data storage arrays;
   executing a unified sequence number component by the controller of the supervisor local data storage array;
   prior to transmitting a mirror WRITE request directed to the mirror unified data set from a local data storage array,
      requesting by the controller of the local data storage array a unified sequence number to associate with the mirror WRITE request from the unified sequence number component, and
      including a unified sequence number received from the unified sequence number component within the mirror WRITE request;
   under synchronous mirroring,
      when the unified-sequence-number component of the supervisor local data-storage array receives a request for a unified sequence number to include in a mirror WRITE request directed to the mirror unified data set, the unified-sequence-number component of the supervisor local data-storage array
         determines whether a mirror WRITE request directed to the mirror unified data set is currently pending, and
         when a mirror WRITE request directed to the mirror unified data set is currently pending, queues the request for a unified sequence number to a unified sequence number request queue, and
         when a mirror WRITE request directed to the mirror unified data set is not currently pending, returns a next unified sequence number to the controller of a local data-storage array; and
   under asynchronous mirroring,
      when the unified-sequence-number component of the supervisor local data-storage array receives a request for a unified sequence number to include in a mirror WRITE request directed to the mirror unified data set, the unified-sequence-number component of the supervisor local data-storage array
         determines whether a maximum number of mirror WRITE requests directed to the mirror unified data set are currently pending, and
         when a maximum number of mirror WRITE requests directed to the mirror unified data set are currently pending, queues the request for a unified sequence number to a unified sequence number request queue, and
         when a maximum number of mirror WRITE requests directed to the mirror unified data set are not currently pending, increments a count of pending mirror WRITE requests, and returns a next unified sequence number to the controller of a local data-storage array.

15. The method of claim 14 further including
   when receiving a mirror WRITE request by a remote data-storage array,
      extracting a unified sequence number from the mirror WRITE request;

determining whether the extracted unified sequence number is a next sequence number for the mirror unified data set;

when the extracted unified sequence number is a next sequence number for the mirror unified data set, carrying out the WRITE request and sending the extracted unified sequence number to all other remote data-storage arrays; and when the extracted unified sequence number is not a next sequence number for the mirror unified data set, waiting to execute the WRITE request until the remote data-storage array detects a preceding unified sequence number.

16. The method of claim 14 further including directly coupling the local data storage arrays via one or more vertical communications media to facilitate sending of requests for unified sequence numbers and sending of unified sequence numbers.

17. The method of claim 14 further including, when the mirror unified data set is distributed over multiple remote data storage arrays, directly coupling the remote data storage arrays via one or more vertical communications media.

18. The method of claim 16 further including, when a communication medium between a local data storage array and a remote data storage array fails, transmitting a WRITE request from the local data storage array to the remote data storage array via a different local data storage array.

* * * * *